(12) United States Patent
Watanabe et al.

(10) Patent No.: US 6,405,242 B1
(45) Date of Patent: Jun. 11, 2002

(54) COMPUTER TERMINAL OPERATION SYSTEM

(75) Inventors: Satoru Watanabe; Ryuichi Matsukura; Kazuo Sasaki, all of Kanagawa; Tohru Okahara, Osaka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/143,402

(22) Filed: Aug. 28, 1998

(30) Foreign Application Priority Data

Mar. 12, 1998 (JP) .......................... 10-060994

(51) Int. Cl.[7] .............................. G06F 13/00
(52) U.S. Cl. ...................................... 709/205
(58) Field of Search ................. 709/200, 203, 709/204, 205, 209, 217, 218, 219, 220, 223, 225, 226, 229

(56) References Cited

U.S. PATENT DOCUMENTS

| | | | | |
|---|---|---|---|---|
| 5,263,158 A | * | 11/1993 | Janis .............................. 707/1 |
| 5,263,165 A | * | 11/1993 | Janis ........................... 711/163 |
| 5,526,524 A | * | 6/1996 | Madduri ...................... 710/200 |
| 5,727,155 A | * | 3/1998 | Dawson ....................... 709/205 |
| 5,781,727 A | * | 7/1998 | Carleton et al. ............. 709/205 |
| 5,908,469 A | * | 6/1999 | Botz et al. ................... 713/201 |
| 5,990,888 A | * | 11/1999 | Blades et al. ................ 345/764 |
| 6,073,242 A | * | 6/2000 | Hardy et al. ................. 713/201 |
| 6,161,110 A | * | 12/2000 | Curtis et al. ................. 707/204 |
| 6,189,032 B1 | * | 2/2001 | Susaki et al. ................ 709/225 |

FOREIGN PATENT DOCUMENTS

JP 6-282363 10/1994

\* cited by examiner

*Primary Examiner*—Moustafa M. Meky
(74) *Attorney, Agent, or Firm*—Staas & Halsey LLP

(57) ABSTRACT

A terminal operation system includes a plurality of terminals connected via a network, wherein an operated terminal can be operated by an operating terminal through an input device, such as a pointer input part or a key input part, connected to the operating terminal. The system controls an appropriate assignment of the operation authority and a smooth transferring of the operation authority among the operating terminals. The operating terminal operates the operated terminal based on a certain level of an operation authority which is layered into a plurality of levels according to the possible function to perform on the operated terminal such as key code input, mouse operation, pointer moving and so on.

20 Claims, 35 Drawing Sheets

FIG. 4

| Operated terminal ID | Operation authority attribute |
|---|---|
| | Mouse operation authority |
| 10 | |

FIG. 5(a)

| Event attribute | Operating terminal ID | X | Y |
|---|---|---|---|
| Pointer | 30 | 35 | 28 |

FIG. 5(b)

| Event attribute | Operating terminal ID | User ID | X | Y |
|---|---|---|---|---|
| Pointer | 30 | A | 35 | 28 |

FIG. 6(a)

| Event attribute | Operating terminal ID | Operation attribute | X | Y |
|---|---|---|---|---|
| Mouse | 30 | Button down | 35 | 28 |

FIG. 6(b)

| Event attribute | Operating terminal ID | User ID | Operation attribute | X | Y |
|---|---|---|---|---|---|
| Mouse | 30 | A | Button down | 35 | 28 |

FIG. 7

| Event attribute | Operating terminal ID | Pressed key code |
|---|---|---|
| Keyboard | 30 | A |

FIG. 9

| Operating terminal ID | Operation authority attribute |
|---|---|
| 20 | Complete operation authority |
| 30 | Mouse operation authority |

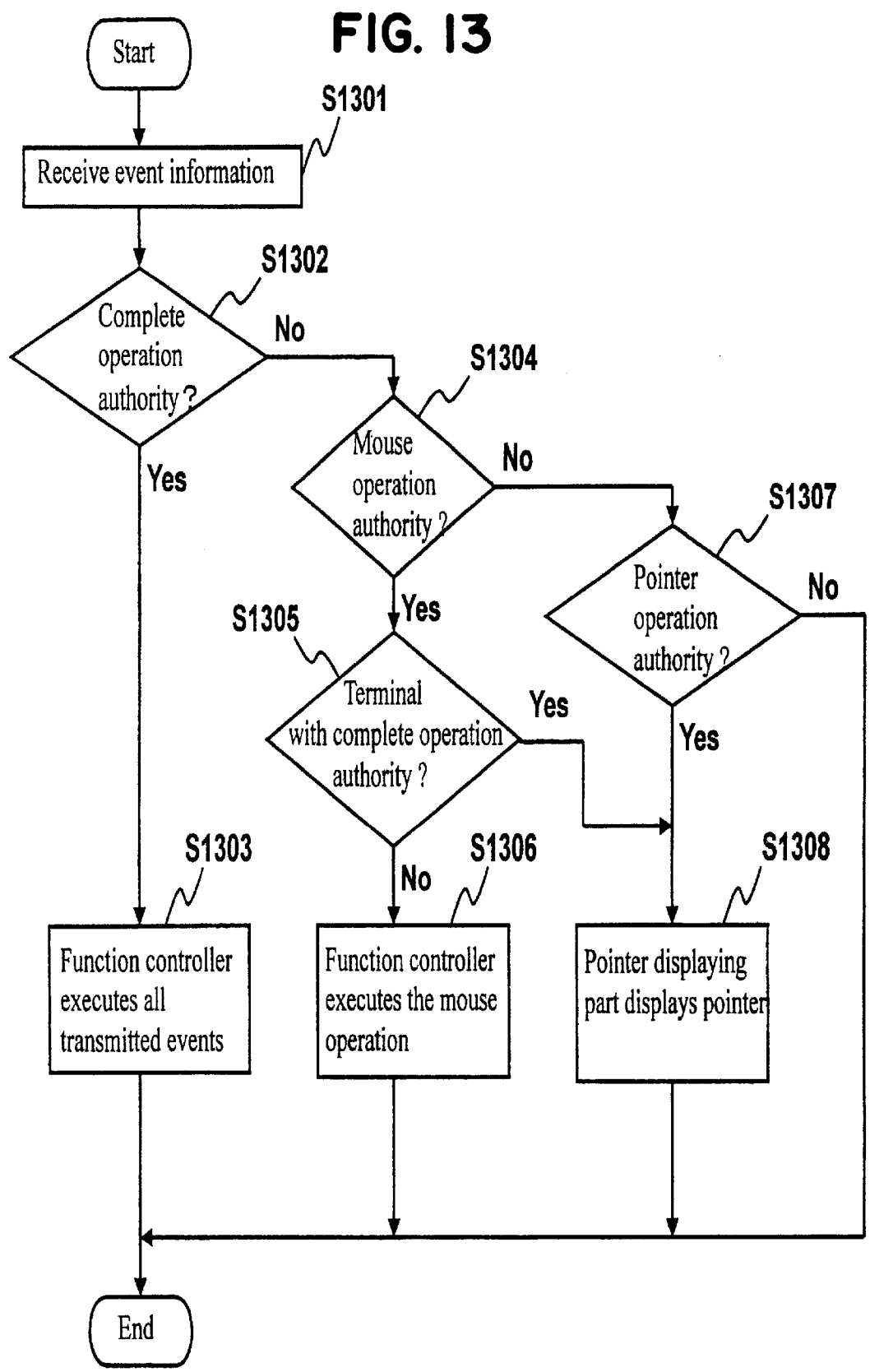

FIG. 14(a)

| Operated terminal ID | Operation authority attribute | User ID |
|---|---|---|
| 10 | Mouse operation authority | W |

FIG. 14(b)

| Operated terminal ID | Operation authority attribute | User ID |
|---|---|---|
| 10 | Mouse operation authority | watanabe |

FIG. 16(a)

| User ID | User pointer identifier |
|---|---|
| watanabe | W |
| matsukura | M |

FIG. 16(b)

| Terminal ID | User pointer identifier |
|---|---|
| 10.254.211.145 | W |
| 10.254.211.146 | M |

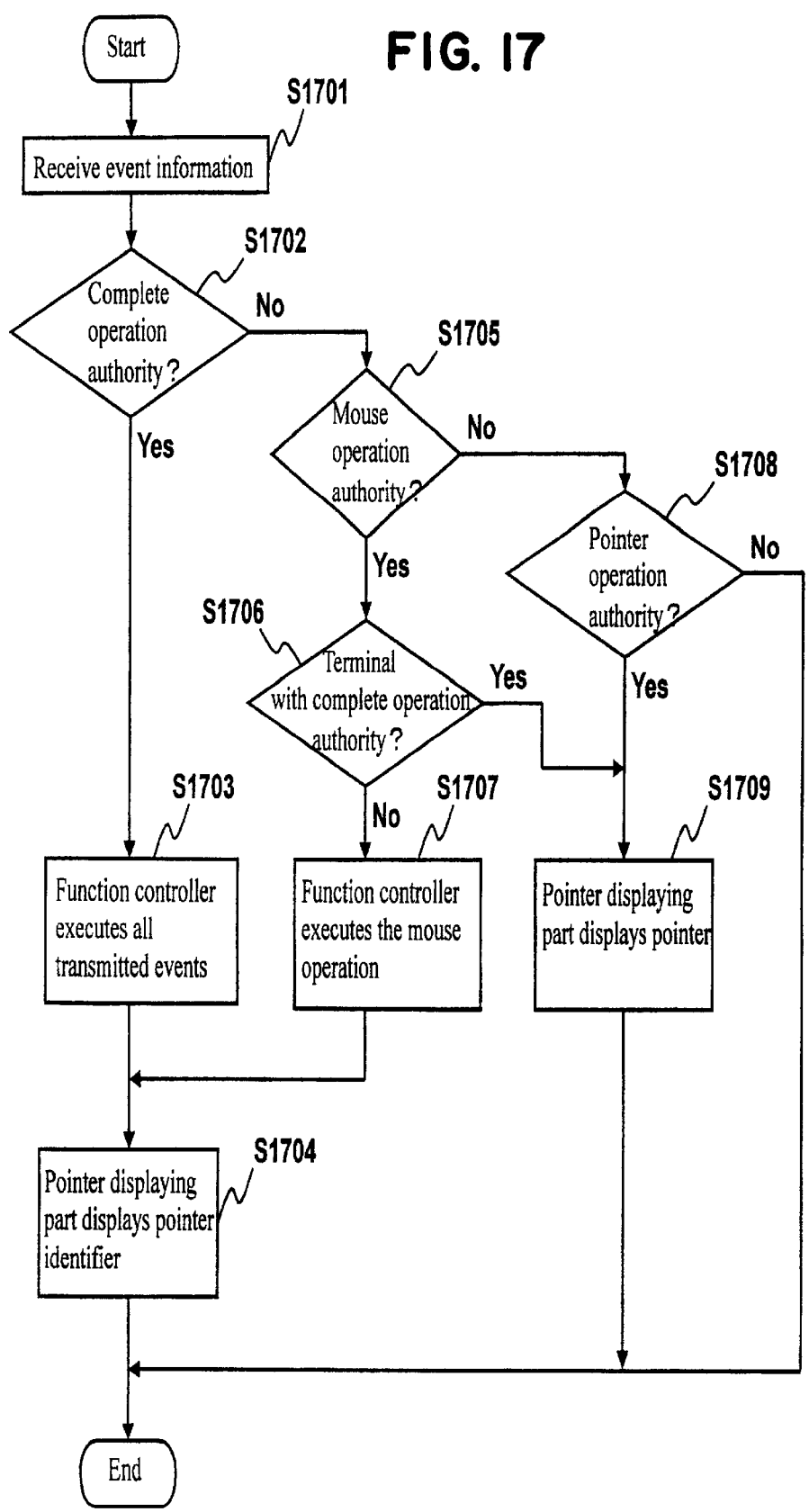

FIG. 20

| Operating terminal ID | Operation authority attribute | Upper operation authority |
|---|---|---|
| 20 | Complete operation authority | — — |
| 30 | Mouse operation authority | Assigned |

FIG. 23

| Operating terminal ID | Operation authority attribute | Complete operation authority flag | Mouse operation authority flag |
|---|---|---|---|
| 20 | Complete operation authority | Off | Off |
| 30 | Pointer operation authority | On | Off |

FIG. 27

| Operating terminal ID | Pointer maximum moving distance |
|---|---|
| 20 | 50 |
| 30 | 60 |

FIG. 29

| Seconds | Events and processing | Maximum moving distance |
|---|---|---|
| 0.0 | Operating terminal 20 requests an operation authority. | Operating terminal 20 (0) |
| 0.5 | Moving distance for 0.5 second is stored in the table. | Operating terminal 20 (50) |
| 1.0 | The moving distance for 0.5 sec of the operating terminal 20 is compared with the value in the table. If it is larger, it renews the value in the table. Operating terminal 30 requests an operation authority. | Operating terminal 20 (50) <br><br> Operating terminal 30 (0) |
| 1.5 | Each moving distance for 0.5 second of the operating terminal 20 and 30 is compared with the value in the table. If it is larger, it replaces the value in the table. (Here, value for terminal 30 replaces the value in the table.) | Operating terminal 20 (50) <br><br> Operating terminal 30 (30) |
| 2.0 | Each moving distance for 0.5 second of the operating terminal 20 and 30 is compared with the value in the table. If it is larger, it replaces the value in the table. (Here, the values for terminals 20 and 30 replace the values in the table.) | Operating terminal 20 (55) <br><br> Operating terminal 30 (45) |
| 2.5 | Each moving distance for 0.5 second of the operating terminal 20 and 30 is compared with the value in the table. If it is larger, it replaces the value in the table. (Here, neither the value for terminal 20 nor for 30 replaces the value in the table.) | Operating terminal 20 (55) <br><br> Operating terminal 30 (45) |
| 3.0 | Each moving distance for 0.5 second of the operating terminal 20 and 30 is compared with the value in the table. If it is larger, it replaces the value in the table. (Here, the values for terminal 20 and for 30 replace the values in the table.) <br> Here, the time is over | Operating terminal 20 (60) <br><br> Operating terminal 30 (75) |

FIG. 34

| Operation authority transferable operating terminal |
|---|
| 10.254.211.145 |
| 10.254.211.146 |

COMPUTER TERMINAL OPERATION SYSTEM

BACKGROUND OF THE INVENTION

1. Field of the Invention

The present invention relates to a remote computer terminal operation system for operating a computer terminal from another computer terminal on a computer network.

2. Description of the Related Art

Electronic conference systems have been developed and are gradually utilized for conferences in practice. An electronic conference system comprises a personal computer having a large projection monitor and computer terminals connected by a computer network such as a LAN. Electronic conference attendants can display their electronic document data on the large projection monitor and make their presentation and remarks with a pointing device such as a mouse via the computer network by operating the computer terminal, which has a large projection monitor, from each computer terminal.

An important issue of such an electronic conference system, in which a computer terminal can be operated from other computer terminals, is how to control and manage the authority of operating (hereinafter, referred to as "operation authority") the computer terminal with the projection monitor (hereinafter, referred to as "operated terminal") from other computer terminals (hereinafter, referred to as "operating terminals"), because operation commands from the operating terminals may compete on the operated terminal when the same level of operation authority has been assigned to these operating terminals at the same time. This can result in a situation where, for example, an attendant who is making presentation and remarks concerning an electronic document on the projection monitor may not use his electronic pointer smoothly.

To solve above-mentioned problem, a technology for switching the operating authority automatically is disclosed in Publication of Japanese Unexamined Patent Application "Tokkai Hei 6-282363". According to this technology, when a controller receives a request for assigning an operation authority from another terminal that is trying to operate the operated terminal, the controller can ask the operating terminal that has operation authority and is currently operating the operated terminal whether it is possible to return and pass on the operation authority. The controller can switch and pass the operation authority among operating terminals according to the priority of commands issued by the operating terminals.

However, according to this conventional technology, it is very inconvenient to operate such a system under the condition that only one operating terminal can operate the operated terminal at a time. Therefore, several attendants cannot operate the electronic documents displayed on the projection monitor at the same time. For example, several attendants cannot operate their mouse and point at the electronic documents by using the pointer of their mouse at the same time. This problem restricts the convenience of the electronic conference system.

SUMMARY OF THE INVENTION

Therefore, with the foregoing in mind, it is an object of the present invention to provide a computer terminal operation system that can appropriately control the assignment of the operation authority for operating one operated terminal from several operating terminals at the same time.

It is another object of the present invention to provide a computer terminal operation system that can control the passing and transitioning of the operation authority among operating terminals smoothly on the basis of the control of the assignment of the operation authority.

To achieve these objects, a computer terminal operation system of the present invention includes a plurality of terminals connected via a network, wherein an operated terminal can be operated by at least one operating terminal through an input device connected to the operating terminal; the operating terminal has a certain operation authority which corresponds to one of a plurality of operation authority levels that are layered in accordance with the functions that can be performed on the operated terminal; and the operating terminal operates the operated terminal according to its operation authority.

In one embodiment of the present invention, the operation authority is layered into a plurality of levels in accordance with the functions that can be performed on the operated terminal from operating terminal. That is to say, these possible functions can be classified into functions that can be performed by the plural operating terminals simultaneously and functions that cannot be performed smoothly when performed simultaneously. The terminal operation system of this invention achieves an appropriate assignment of the operation authority when plural operating terminals compete to obtain the operation authority by assigning the requested operation authority to the operating terminal having the highest priority and assigning the lower level operation authority to other operating terminals to permit the functions which can be performed simultaneously. There are various methods for layering the operation authority and determining the priority of the each terminal.

It is preferable that the operating terminal further comprises an operation authority selecting part for selecting one operation authority from the plurality of operation authority levels; an operation information generating part for generating the operation information required to operate the operated terminal based on the operation authority selected by the operation information authority selecting part; and an operation information transmitting part for transmitting the operation information generated by the operation information generating part to the operated terminal; and the operated terminal further comprises an operation information receiving part for receiving the operation information transmitted by the operation information transmitting part; and an operation performing part for performing the operation requested by the operating terminal on the operated terminal on the basis of the information received by the operation information receiving part.

This embodiment makes it possible to reduce the load of the system by reducing the information quantity on the network in order to transmit necessary information to the operated terminal based on the kind of the operation authority selected by the operating terminal.

It is also preferable that the operating terminal further comprises an operation authority assigned terminal determining part for determining one operating terminal from a plurality of operating terminals when the operation information receiving part receives the operation information based on the same kind of operation authority, the operation terminal by which an operation based on the operation authority is performed; and the operation performing part performs only a predetermined operation when an operation information is transmitted from a terminal that is not the operating terminal determined by the operation authority assigned terminal determining part as the operating terminal.

In this configuration, the operated terminal can omit the transmission of the result of the determination to other operating terminals after the operated terminal determines the operating terminal having the highest priority, specifically, it determines the operating terminal which is permitted to perform the function requested based on the operation authority.

It is also preferable that the predetermined operation is the operation of moving a pointer using a pointing device; and the operated terminal further comprises an multiple pointer displaying part for displaying a plurality of pointers on a display based on the operation information which indicates the operation of moving a pointer from a terminal that is not the operating terminal determined by the operation authority assigned terminal determining part as the operating terminal For example, when the terminal operating system of the present invention is applied to an electronic conference system, pointer moving operation can be permitted to the attendants. The pointer moving operation will not disturb other attendants' operation.

According to another aspect of the present invention, a terminal operation system includes a plurality of terminals connected via a network, wherein an operated terminal can be operated by an operating terminal through an input device connected to the operating terminal; the operating terminal has a certain operation authority which corresponds to one of a plurality of operation authority levels that are layered in accordance with the functions that can be performed on the operated terminal; and the operated terminal comprises an operation authority requesting terminal storage part for storing at least one operating terminal which tries to obtain the operation authority for operating the operated terminal in a predetermined period that starts when the operating terminal tries to obtain an operation authority in a certain level; and an operation authority assigned terminal determining part for determining after a predetermined period an operating terminal to which the operation authority is assigned out of the operation terminals stored during said predetermined period in the operation authority requesting terminal storage part.

When determining the operating terminal to which the operation authority should be assigned, it is not always necessary to assign the operation authority to the terminal which requests the assignment of the operation authority first. Specifically, the terminal operation system of the present invention provides functions for performing smooth operation authority transferring by storing at least one operating terminal which request the assignment of the operation authority within a certain period and by determining the operating terminal to which the operation authority is assigned in practice.

According to still another aspect of the present invention, a computer-readable recording medium storing a program is provided. The program provides functions for operating an operated terminal over a network by an operating terminal. The program comprises processes for realizing an operation authority request receiving step, where a request for an operation authority for operating an operated terminal on a network is received from an operating terminal which tries to operate the operated terminal; an operation authority requesting terminal storing step, where at least one operating terminal which tries to obtain the operating authority for operating the operated terminal within a predetermined period after receiving the request is stored; and an operation authority assignment terminal determining step, where an operating terminal is selected after said predetermined period from the at least one operating terminal stored during said operation authority requesting terminal storing step to be the operating terminal to which the operation authority is assigned.

These and other advantages of the present invention will become apparent to those skilled in the art upon reading and understanding the following detailed description with reference to the accompanying figures.

BRIEF DESCRIPTION OF THE DRAWINGS

FIG. 4 is an example of the contents of an operation terminal managing table according to a first embodiment of the present invention.

FIG. 5 is an example of the event information in case that a pointer operation authority is obtained.

FIG. 6 is an example of the event information in case that a mouse operation authority is obtained.

FIG. 7 is an example of the event information when the information entered from the keyboard is sent when a complete operation authority is obtained.

FIG. 9 is an example of the contents of an operation authority managing table according to a first embodiment of the present invention.

FIG. 13 is a flow chart showing the processing procedure of the controller of the operated terminal according to a second embodiment of the present invention.

FIG. 14 is an example of the contents of an operation terminal managing table according to a third embodiment of the present invention.

FIG. 16 is an example of the contents of a user identifier managing table stored in the operated terminal according to a third embodiment of the present invention.

FIG. 17 is a flow chart showing the processing procedure of the controller of the operated terminal according to a fourth embodiment of the present invention.

FIG. 20 is an example of the contents of an operation authority managing table according to a fifth embodiment of the present invention.

FIG. 23 is an example of the contents of an operation authority managing table according to a seventh embodiment of the present invention.

FIG. 27 is an example of the contents of an operation authority transition status managing table according to a tenth embodiment of the present invention.

FIG. 29 is a diagram illustrating a content of events and processing of an operation authority transition status according to the tenth embodiment.

FIG. 34 is an example of the contents of a managing table of the terminal that can provide operation authority according to an eleventh embodiment of the present invention.

DESCRIPTION OF THE PREFERRED EMBODIMENTS

Hereinafter, the present invention will be described by way of embodiments with reference to the accompanying drawings.

Figure 1:
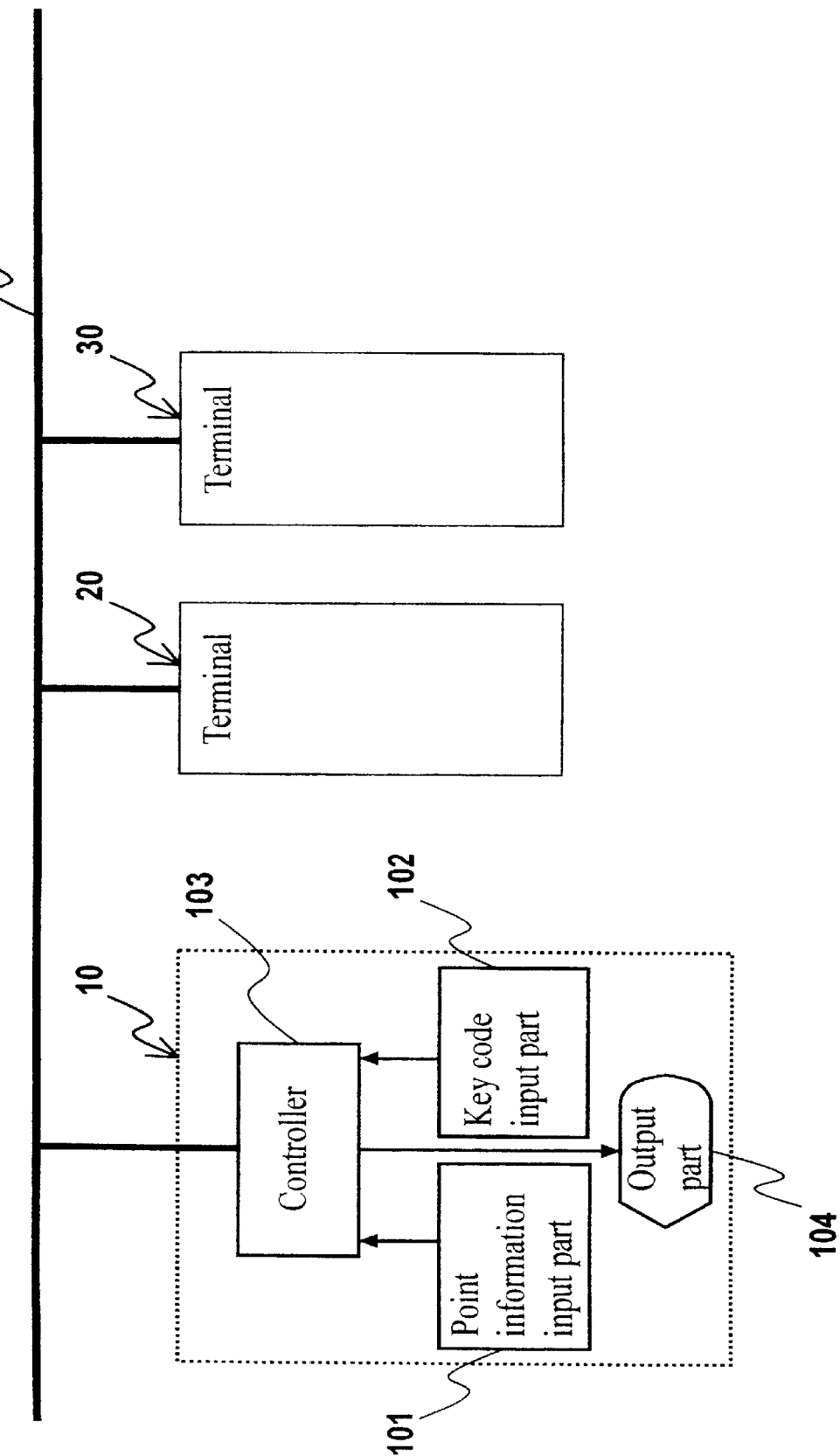
FIG. 1 is a block diagram showing the environment for operating the computer terminal operation system of the present invention.

FIG. 1 is a block diagram showing the basic environment in which a computer terminal operation system is realized. As shown in FIG. 1, the computer terminal operation system of the present invention is realized by a computer network comprising a number of terminals 10, 20, 30 . . . etc., which include a point information input part 101, a key code input part 102, a controller 103 and output part 104. All terminals are connected via a computer network such as a LAN 50.

As the point information input part 101, a pointing device, such as a mouse, can be used. As the key code input part 102, input device such as keyboard can be used.

The controller 103 controls the whole system. The controller includes a CPU (central processing unit) and an I/O (input-output) interface unit. The controller 103 further includes a communication interface unit to communicate entered operating data from one terminal to other terminals. For example, a communication control module on the basis of the TCP/IP protocol bundled with Windows™ can be used to communicate entered data from one terminal to the others.

When the terminal performs as an operated terminal, the controller 103 will run and activates program modules for data processing which the operated terminal should execute to control the operation authority. When the terminal performs as an operating terminal, the controller 103 runs and activates program modules for data processing which the operating terminal should execute. Thus, the computer terminal operation system of the present invention can be achieved.

As the output part 104, an output sub-system such as a display monitor can be used. The computer network system is a peer-connected computer network where several terminals are connected on equal terms. This computer terminal operation system can be used as an electronic conference system by connecting a large projection monitor to one of the terminals and controlling the terminal with the large projection monitor from other terminals.

Embodiments of the computer terminal operation system of the present invention that are achieved under the computer environment as described above are described below.

Embodiment 1

A first embodiment of the present invention is described with reference to the accompanying drawing's. This first embodiment explains the layered operation authorities and how to control several layered operation authorities. For the sake of convenience, it is assumed the terminal 10 is utilized as an operated terminal and the other terminals (terminal 20, terminal 30, . . . , ) are utilized as operating terminals. However, there is no restriction to the assignment for the terminals, and the terminal 10 can be assigned as an operation terminal and the terminal 20 can be assigned as an operated terminal, for example.

Hereinafter, "layered operation authority" means the classification of the operation authority into one or several kinds of layered operation authority classes. These authority classes comprise an operation authority which permits to operate the operated terminal by using an input part (hereinafter, referred to as "complete operation authority") and an operation authority which permits to operate the operated terminal with a part of the functions which a terminal with complete operation authority can take (hereinafter, referred to as "partial operation authority").

An example of the partial operation authority is "pointer operation authority". The pointers corresponding to the operating terminals are displayed onto the projection monitor in addition to the pointer of the operated terminal which is normally displayed on the projection monitor, and the pointer operation authority permits the user to operate only the assigned pointer. Another example of the partial operation authority is "mouse operation authority". The mouse operation authority permits the user to input and operate all point information which the user can input with a mouse, such as "click", "drag", "double click" in addition to the functions that pointer operation authority can perform. The complete operation authority is defined as the operation authority which permits the user to use all functions including the functions of the mouse operation authority and the functions entered with the keyboard, and provides an operation environment as if the user uses his own local operation user interface.

Figure 2:
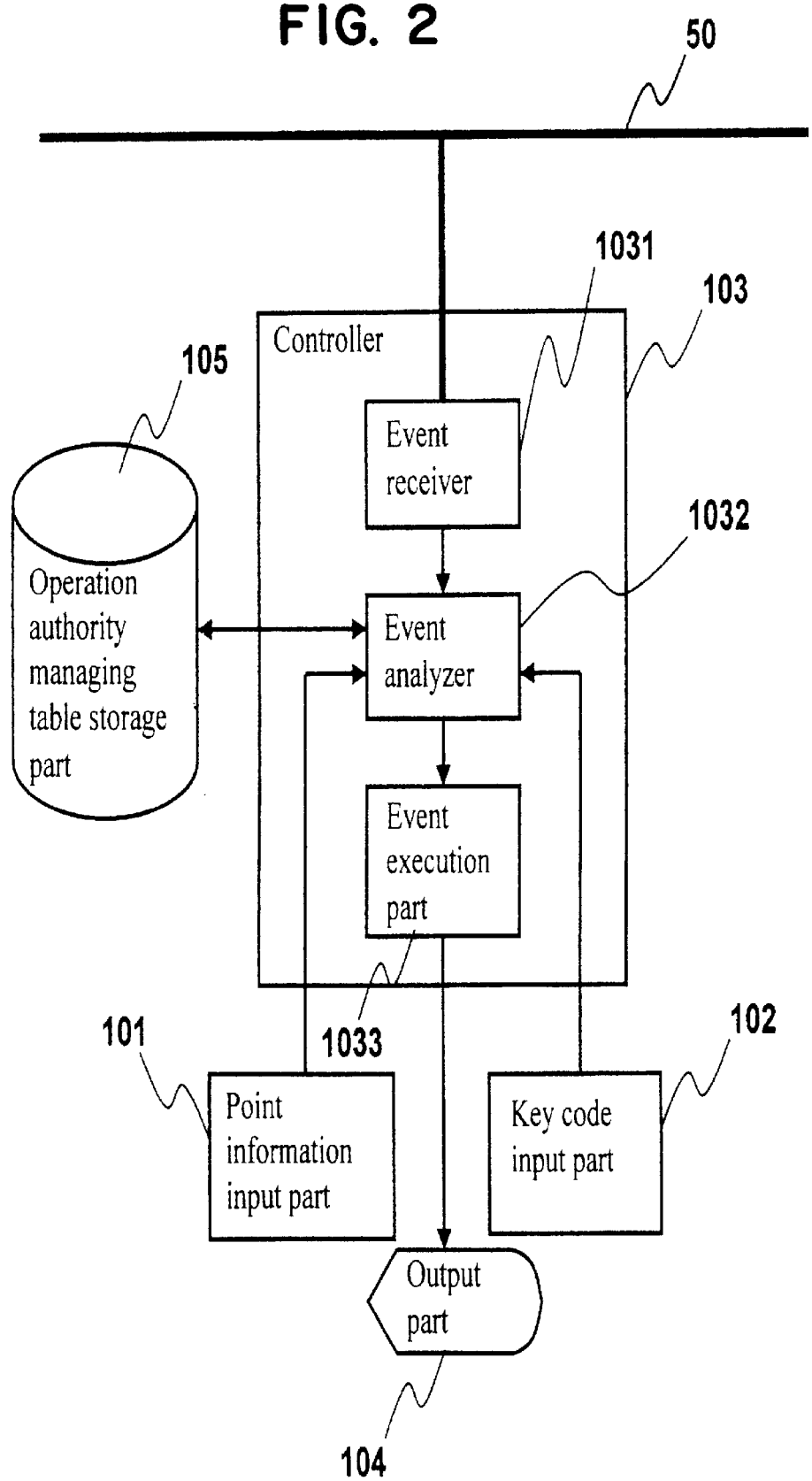
FIG. 2 is a block diagram showing the structure of an operated terminal according to a first embodiment of the present invention.

FIG. 2 is a block diagram showing an example of the basic structure of an operated terminal 10. As shown in FIG. 2, the operated terminal 10 of the present invention includes a point information input part 101, a key code input part 102, a controller 103, an output part 104, and an operation authority managing table storage part 105. The controller 103 includes an event receiving part 1031, an event analyzer 1032, and an event executing part 1033.

Figure 3:
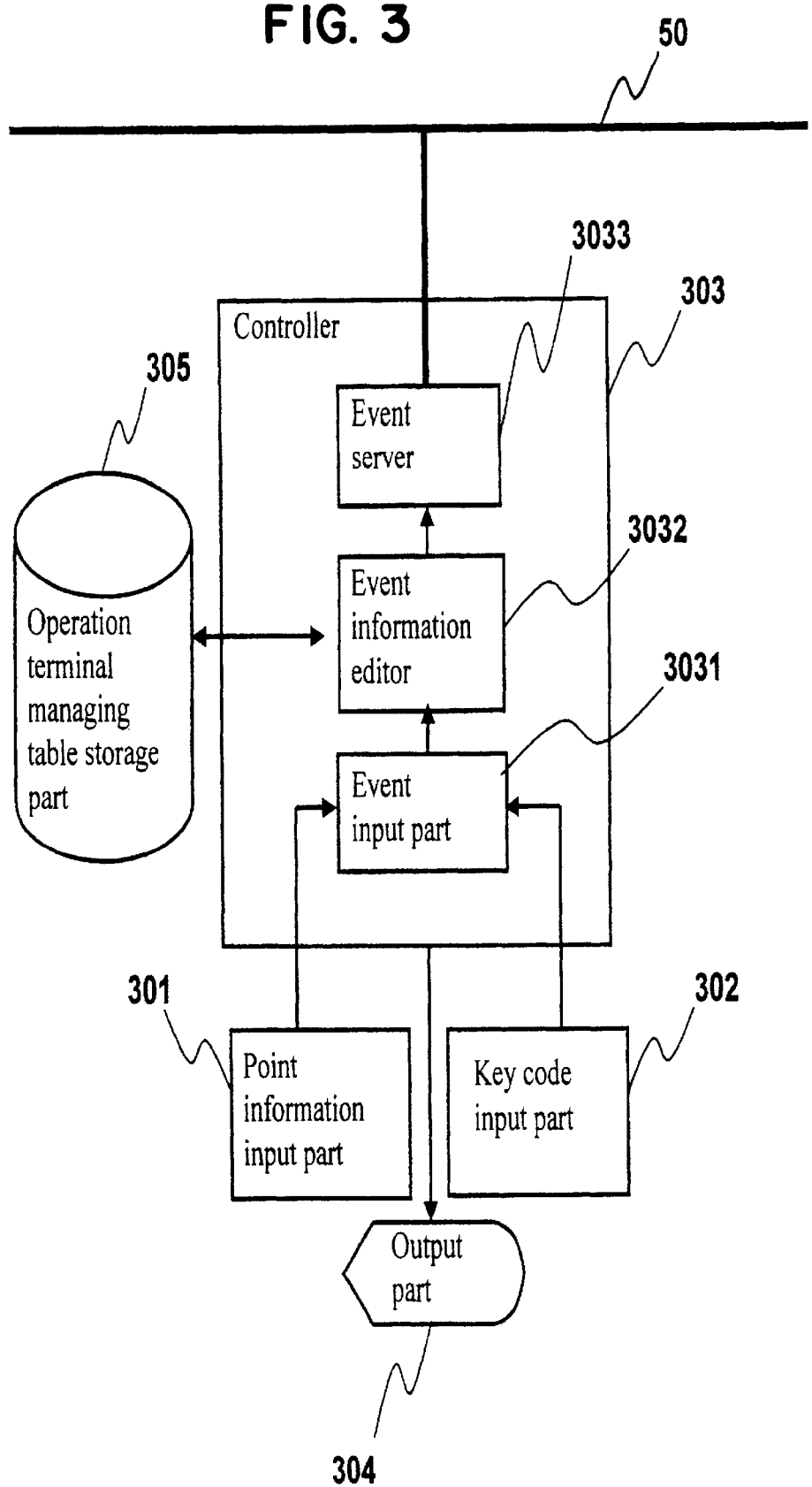
FIG. 3 is a block diagram showing the structure of another operated terminal according to a first embodiment of the present invention.

FIG. 3 is a block diagram showing the example basic structure of an operating terminal 30. As shown in FIG. 3, the operating terminal 30 of the present invention includes a point information input part 301, a key code input part 302, a controller 303, an output part 304, and an operation terminal managing table storage part 305. The controller 303 includes an event receiving part 3031, an event information editor 3032, and an event information server 3033.

The event receiving part 3031 receives input events (hereinafter, referred to simply as "events") from the input device, e.g. the pointing device (mouse), provided as the point information input part 301 and the keyboard provided as the key code input part 302.

The event information editor 3632 refers to the operation terminal managing table stored in the operation terminal managing table storage part 305, and edits the event information for the operated terminal corresponding to the event which has been received by: the event receiving part 3031.

FIG. 4 is an example of the operation terminal managing table. As shown in FIG. 4, the operation terminal managing table stores "operated terminal identifier" and "attribute of the operation authority" of the current operation authority. In this operation terminal managing table, only the information about the own operating terminal is stored when an operating terminal requests to be issued the operation authority.

The operated terminal identifier indicates the operated terminal which the operating terminal in question tries to operate. FIG. 4 illustrates an example of data for the operation terminal managing table, and the "operated terminal identifier" is expressed as "operated terminal 10", but actually, for example an IP (internet protocol) address of the operated terminal 10 is stored as the operated terminal identifier.

The attribute of the operation authority is the information for indicating what kind of operation authority the operating terminal tries to obtain. FIG. 4 illustrates the example of data of the operation terminal managing table, and the "attribute of the operation authority" is expressed as "pointer operation authority", but actually, the identifier such as assigned number can be used as the attribute of the operation authority.

The event information editor 3032 edits the event information with reference to the above-mentioned information.

The following describes the event information in detail. The event information consists of the information about the event entered at the operating terminal and information to be sent to the operated terminal for its operation. Herein, the "event" means actions on the operating terminal such as that the mouse button is pushed down herein after referred to as "button down"), the pushed button of the mouse is released (herein after referred to as "button up"), the pointer of the mouse is moved (herein after referred to as "mouse move"), a key of the keyboard is pushed down. Therefore, a "click" of the mouse can be detected by the serial action of the "button down" and the "button up", and a "dragging" of the mouse can be detected by the "mouse move" within the series of actions "button down" and "button up". As Windows95™ is used as an operating system (hereinafter referred to as "OS"), the action of the mouse double click is detected as a single event instead of a combination event of the "button down" and the "button up".

FIG. 5 is an example of the event information sent by the operating terminal when the operating terminal has obtained the "pointer operation authority". As shown in FIG. 5(a), the possible event information generated under the pointer operation authority are "event attribute", "operation terminal identifier", "X coordinate" of the mouse position and "Y coordinate" of the mouse position.

The event attribute indicates what kind of event the event information belongs to. FIG. 5 illustrates that the event information for indicating movement of the pointer is stored as the event attribute.

The operation terminal identifier indicates the operation terminal which tries to operate the operated terminal. FIG. 5 illustrates that "the operation terminal identifier" is expressed as "30", and it indicates that the event information is sent from the operation terminal 30, but actually, a code such as an IP address is stored.

In case of the pointer operation authority, possible events are limited to moving the pointer position. Therefore, "X coordinate" and "Y coordinate" of the pointer position in addition to the "attribute of the operation authority" and the "operation terminal identifier" are sent as event information.

FIG. 5(b) illustrates an example of the event information when the pointer is displayed accompanying the user identifier as described later. In this case, shown as FIG. 5(b), user identifiers in addition to above-mentioned event information are included as event information. In this example shown as FIG. 5(b), one capital letter is sent as the user identifier to be stored in the event information in order to add and combine the letters to displayed pointer. In this case, the operating terminal user should preliminarily input one letter such as his initial for his identification via the key code input part 302. Herein, instead of sending the letter from the operating terminal, the operating terminal can send the event information including a user ID and the operated terminal can convert the user ID to the corresponding letter.

FIG. 6 is an example of the event information which is sent by the operating terminal in case that the operation authority obtained by the operating terminal is the "mouse operation authority". FIG. 6(a) is an example where the user ID is added to the event information. FIG. 6(b) is an example in case that the user ID is not added to the event information. Whether the user ID is added to the event information is determined based on the user ID combined with the pointer. As shown in FIG. 6, the event information in case the mouse operation authority is obtained includes "event attribute", "operation terminal identifier", "user ID", "action attribute", "X coordinate" of the pointer position and "Y coordinate" of the pointer position. Herein, "user ID" does not need to be included in case the user ID is not added and combined to the pointer. For example, an IP address can be used instead of the user ID. Moreover, if the operated terminal memorizes the relation between operating terminal and the assigned communication port number when communication routes are built between the operated terminal and the operating terminals, the operated terminal can recognize the operating terminal by checking the communication port number.

Regarding the "event attribute", "operation terminal ID" and "user ID", the same information as for the pointer operation authority is transmitted.

The action attribute indicates the kind of input event, such as "button down", "button up" and "move" of the mouse. In the case of the mouse operation authority, the operating terminal can operate the operated terminal not only by moving the mouse position but also with input through mouse action. Therefore, the action attribute is sent in addition to the X coordinate and Y coordinate of the pointer position. A number-based identifier instead of a character-based information can be stored and used in practice.

FIG. 7 is an example of the event information which is sent by the operating terminal when the operation authority obtained by the operating terminal is the "complete operation authority" and when a key of the keyboard is pushed. As shown in FIG. 7, when a key of the keyboard is pushed, the key code of the pushed key is sent to the operated terminal in addition to the event attribute, operation terminal ID, and so on. FIG. 7 illustrates that key "A" is pushed. In practice, however, the code assigned to the key "A" is sent.

Figure 8:
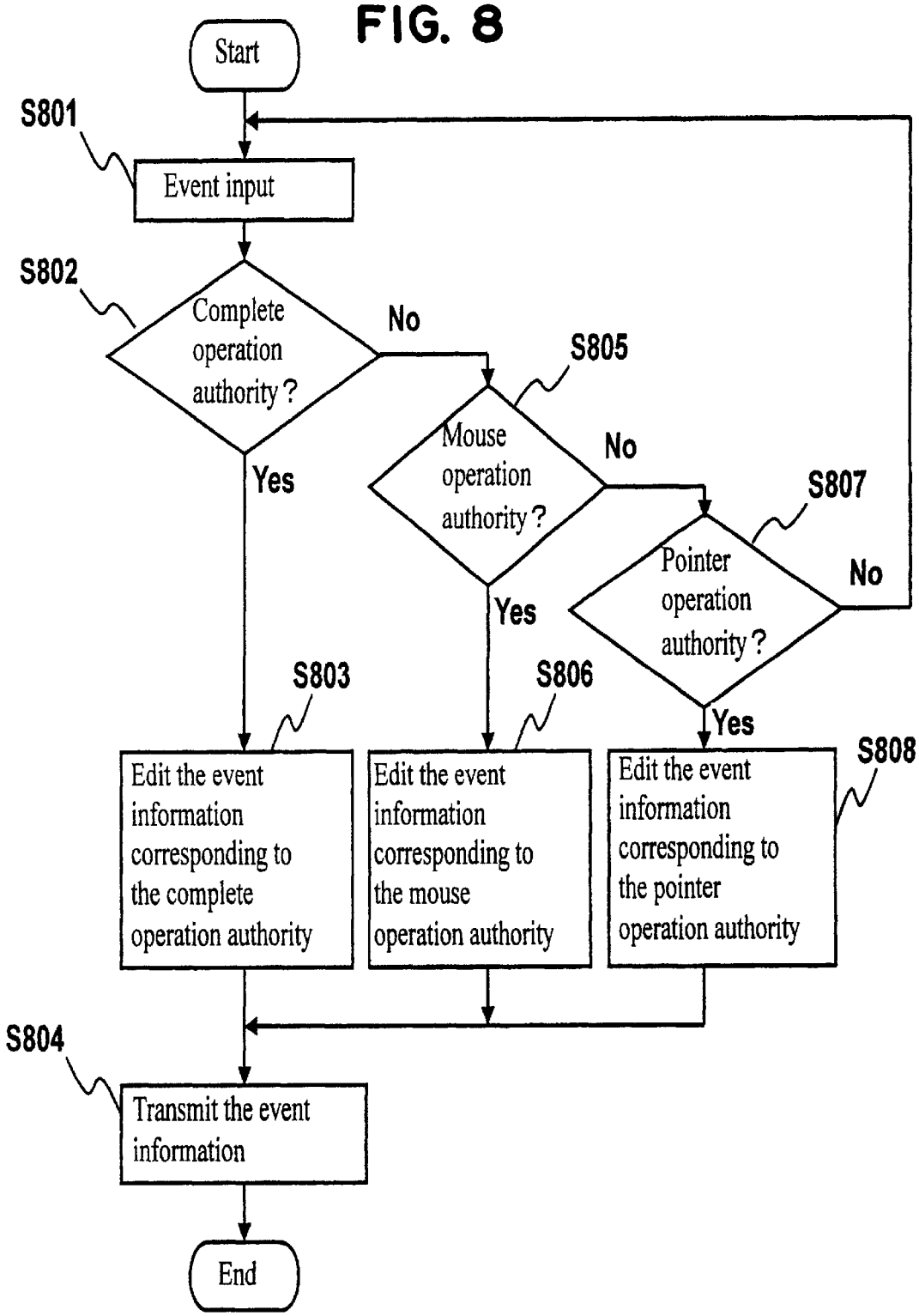
FIG. 8 is a flow chart showing the processing procedure of the controller of the operating terminal according to a first embodiment of the present invention.

As described above, the event information edited by the event information editor 3032 is sent via the event server 3033 to the operated terminal. FIG. 8 is a flow chart showing the procedures of the controller 303 on the side of the operating terminal 30 when the input event is generated by the mouse or keyboard on the operating terminal side.

As shown in FIG. 8, the controller 303 obtains the input event first (S801), and then determines the kind of operation authority which the operating terminal requests with reference to the information of the operation terminal managing table. Therefore, if the requested operation authority is the complete operation authority (S802), the event information corresponding to the complete operation authority is edited (S803). In particular, if the input event has been generated by mouse action, the event information shown in FIG. 6 is edited, and if the input event has been generated by the keyboard, the event information shown in FIG. 7 is edited.

After step S803, edited event information is sent to the operated terminal (S804). If the requested operation authority is the mouse operation authority (S802: No, S805: Yes), the event information corresponding to the mouse operation authority is edited (S806). In practice, the event information shown in FIG. 6 is edited corresponding to the mouse action. Then the edited event information is sent to the operated terminal as in the case of complete operation authority.

If the pointer operation authority (S805: No, S807: Yes) has been obtained, the event information corresponding to the pointer operation authority is edited (S808). In practice, the event information shown in FIG. 5 is edited corresponding to mouse move only and the edited event information is sent to the operated terminal (S804).

If the mouse operation authority or the pointer operation authority are requested, the input event which does not correspond to the operation authority is neglected. In practice, this means that if the requested operation authority is the mouse operation authority, the input event related to the keyboard input is neglected and the event information shown in FIG. 7 is not edited. If the pointer operation authority is requested, the input event related to information such as mouse clicks is neglected by the event information editor 3032 and the event information shown in FIG. 7 is not edited.

The event information sent from the operating terminal 30 is received by the event receiving part 1031 of the operated terminal 10 via the communication route such as a LAN 50.

On the side of the operated terminal 10, the event analyzer 1032 analyzes the received event. In this embodiment, no events except for the event corresponding to the requested operation authority are sent to the operated terminal. Therefore, the desired event is executed on the operated terminal according to the indicated event sent as the event information.

However, if event information is sent from several operation terminals simultaneously, the priority of the event information among the operating terminals has to be determined. Several methods for judging the priority among the event information can be applied. In this embodiment, the priority corresponding to the authority assigned to the terminals is stored in a table, and the judgment is performed with reference to this table. Specifically, in this embodiment, the event analyzer 1032 determines the operating terminal to execute the event with reference to the information in the operation authority managing table stored in the operation authority managing table storage part 105.

FIG. 9 is a diagram illustrating the contents of an operation authority managing table. As shown in FIG. 9, the information of the operating terminal ID and the operation authority attribute which the operating terminal obtains are stored in the operation authority managing table of a first embodiment of the present invention. The point that the information such as the terminal IP address is stored as the terminal ID and the point that the identifier utilizing information such as numbers are stored as the operation attribute is the same as for the operation terminal managing table on the operating terminal side.

Figure 10:
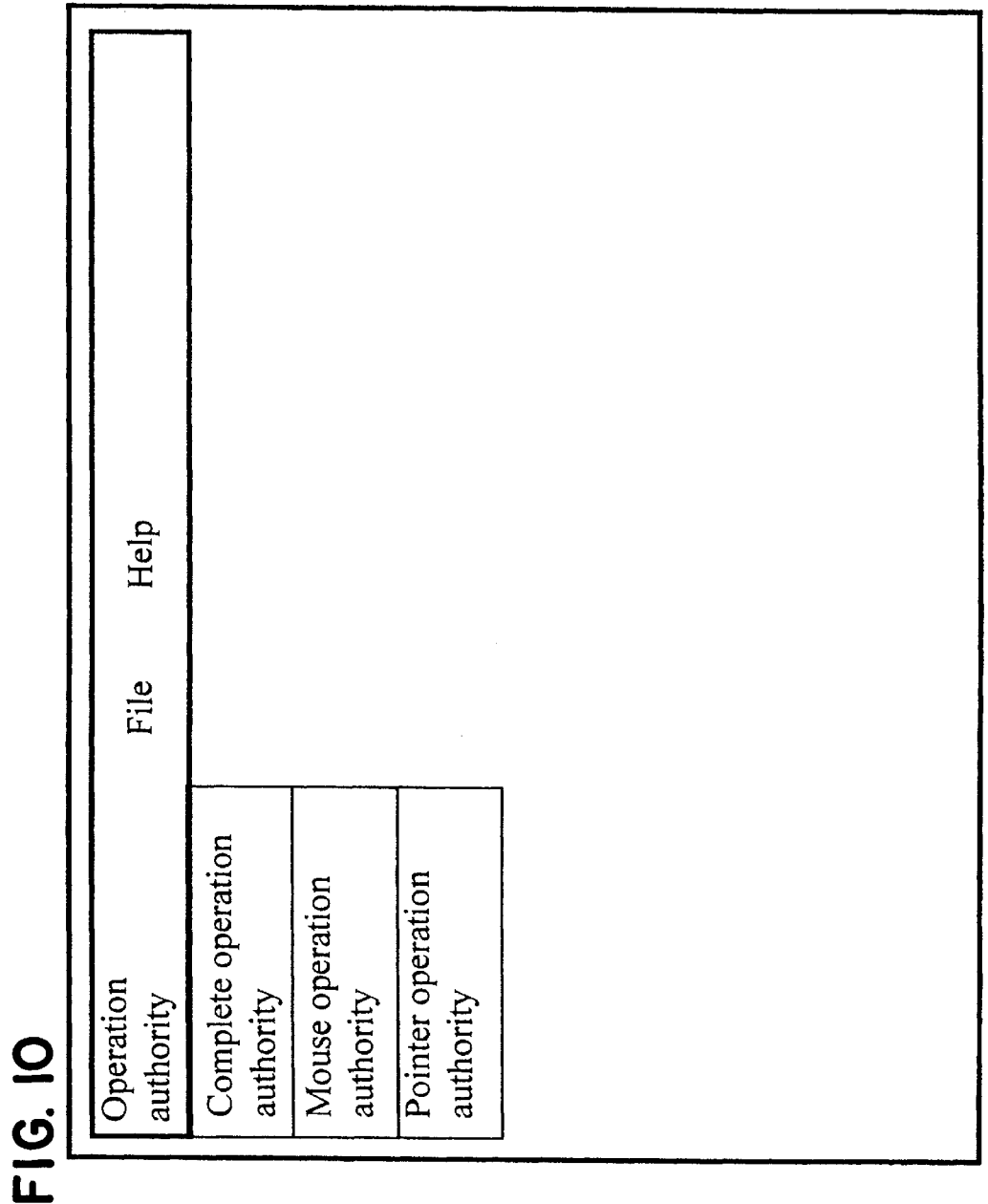
FIG. 10 is a diagram illustrating an example of the contents of a pull-down menu when requesting an operation authority.

The storing process of the information to the operation authority managing table is described in the following. Regarding the terminal operation system in the first embodiment of the present invention, when the operating terminal requests the assigning of the operation authority, the requesting operation authority attribute can be specified by software-switching on the operating terminal side. FIG. 10 is a diagram illustrating the pull-down menu shown on the output part 304 of the operating terminal 30 when requesting the operation authority. In the description of this embodiment, the terminal 10 is permanently selected as the operated terminal. However, another terminal than the terminal 10 can be operated as an operated terminal by specifying the requesting operation attribute and the operated terminal ID.

Here, the specified operation authority is not only stored in the operation terminal managing table in the operating terminal 30, but also in the operation authority managing table in the operated terminal 10 by transmission to the operated terminal 10 via the LAN 50. Specifically, the event analyzer 1032 receives the signal for requesting to assign the operation authority transmitted from the operating terminal, then the transmitted information is stored in the operation authority managing table on the basis of the operation authority attribute which the operating terminal requests.

In this process, the information stored in the operation authority managing table could be revised on the operated terminal side because the operation authority requested by the operating terminal is not always consistent with the operation authority actually assigned to the operating terminal by the operated terminal. However, in this embodiment, to simplify the description, it is assumed that the requested operation authority is assigned as requested. The controlling process for actually assigning the operation authority attribute on the operated terminal side is described in the following embodiments.

In this embodiment, the event executing part 1033 executes the events according to the analysis by the event analyzer 1032's reference to the information in the operation authority managing table. For example, the results of the processing are reflected by the information displayed on the output part 104. In this embodiment, data input via point information input part 104 or key code input part 102 on the operated terminal 10 side always has priority in requesting information from other operating terminals. However, it is possible to set the priority in requesting information from other terminals by adjusting the processing of the event analyzer 1032.

Figure 11:
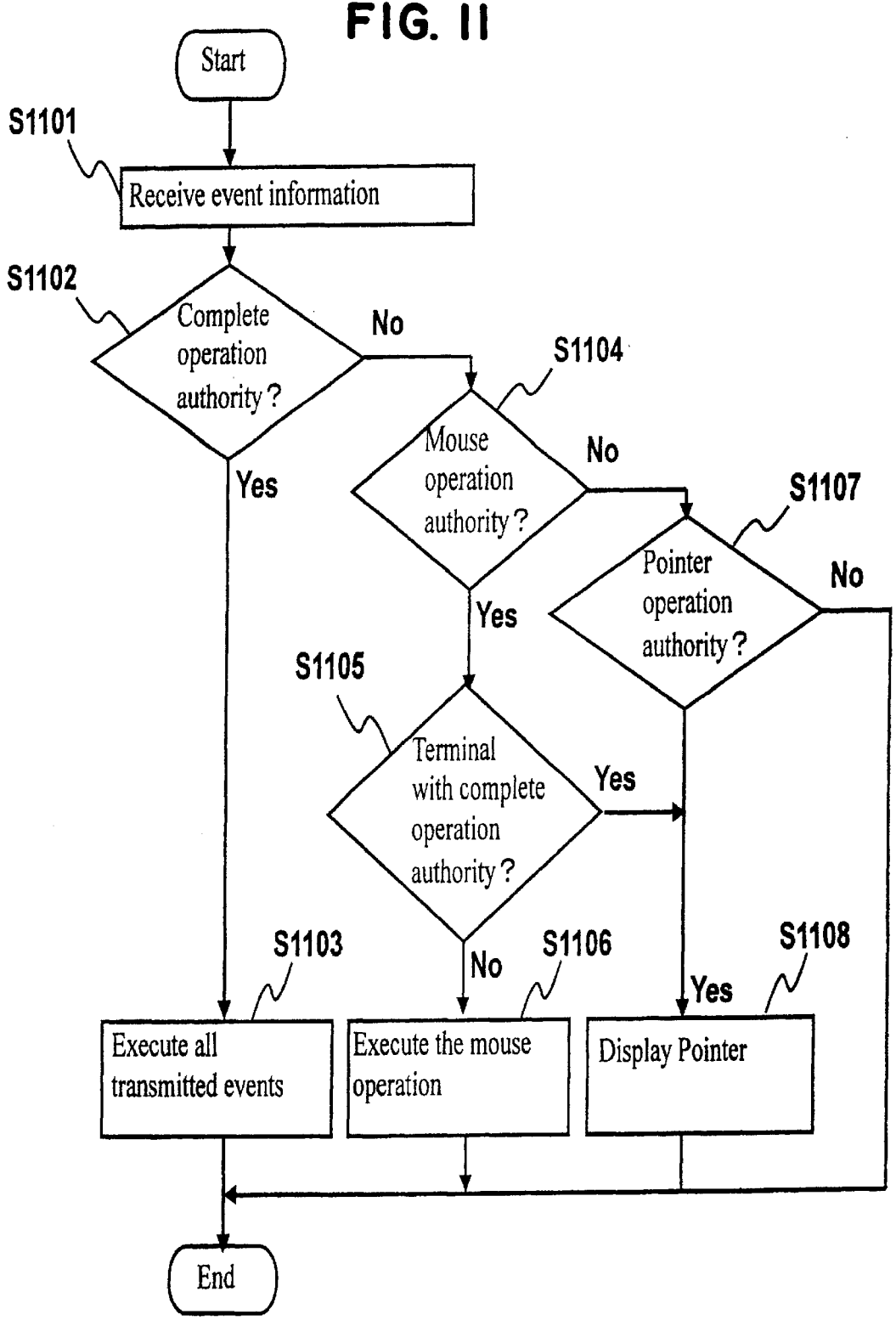
FIG. 11 is a flow chart showing the processing procedure of the controller of the operated terminal according to a first embodiment of the present invention.

The following describes practical processing of the operated terminal 10 in this embodiment. FIG. 11 is a flow chart showing the processing procedures of the controller 103 of the operated terminal 10 according to a first embodiment of the present invention. As shown in FIG. 11, the controller 103 receives the event information from the operating terminal via the event receiving part 1031 (S1101), then the event analyzer 1032 judges what kind of operation authority is assigned to the operating terminal by referencing the information in the operation authority managing table (S1102). As has been described above, it is assumed that the operation authority which is assigned and stored in the operation authority managing table is consistent with the operation authority which is requested by the operating terminal and stored in the operation terminal managing table in each operating terminal.

If the assigned operation authority is the complete operation authority (S1102: Yes), all events on the operated terminal are performed according to the transmitted all event information (S1103).

If the assigned operation authority is the mouse operation authority (S1102: No, S1104: Yes), the event analyzer 1032 determines whether the terminal to which the complete operation authority is assigned exists. This judgement is performed by referencing the information of the operation authority managing table (S1105).

If there is no terminal to which the complete operation authority is assigned (S1105: No), all events specified by mouse operation can be performed without difficulties. Therefore, all mouse events are performed according to the event information. However, if there is a terminal to which the complete operation authority has been assigned (S1105: Yes), mouse operations except for pointer display are ignored on the operated terminal because the collision of the mouse operations, such as mouse clicks, by the terminal to which the complete operation authority is assigned and by other operating terminals may occur if all mouse operation is permitted. Therefore, in this embodiment, priority is always set permanently to the complete operation authority when the complete operation authority and the mouse operation authority compete. In practice, only the pointer displaying is available to the operating terminal to which the mouse operation authority is assigned (S1105: Yes, S1108). The performed process is the same when the pointer operation authority is assigned.

If the requested operation authority is the pointer operation authority (S1104: No, S1107: Yes), the event executing part 1033 performs the pointer display (S1108). The pointer displaying process when several pointers should be displayed at the same time and, for example, the complete operation authority, the mouse operation authority and the pointer authority are competing (S1108), is described in detail further below.

As described above, the operation authority layered into levels can be used among plural operating terminal by the above-mentioned process.

Embodiment 2

The following describes the second embodiment of the present invention. In this embodiment, the operation authority has layered levels, like the first embodiment. The process for realizing the function for displaying several pointers simultaneously on the output part 104 of the operated terminal (this function is referred to as "multiple pointer function") is described, where several pointers are operated by the terminal to which the pointer operation authority is assigned under the existing of the terminal to which the complete operation authority or mouse operation authority is assigned.

For example, the terminal operation system of the present invention used in an electronic conference system with large projector as described above, it is convenient for attendants that they can use their pointers to point the electronic documents displayed on the projector at the same time. However, if the pointer operation authority is assigned to several attendants at the same time, and if only one pointer can be displayed on the output display part 104, mouse operation such as move operation for a pointer from several attendants will compete. If the mouse operations compete, the pointer will move disorderly on the display and disturb the smooth progress of the electronic conference.

Figure 12:
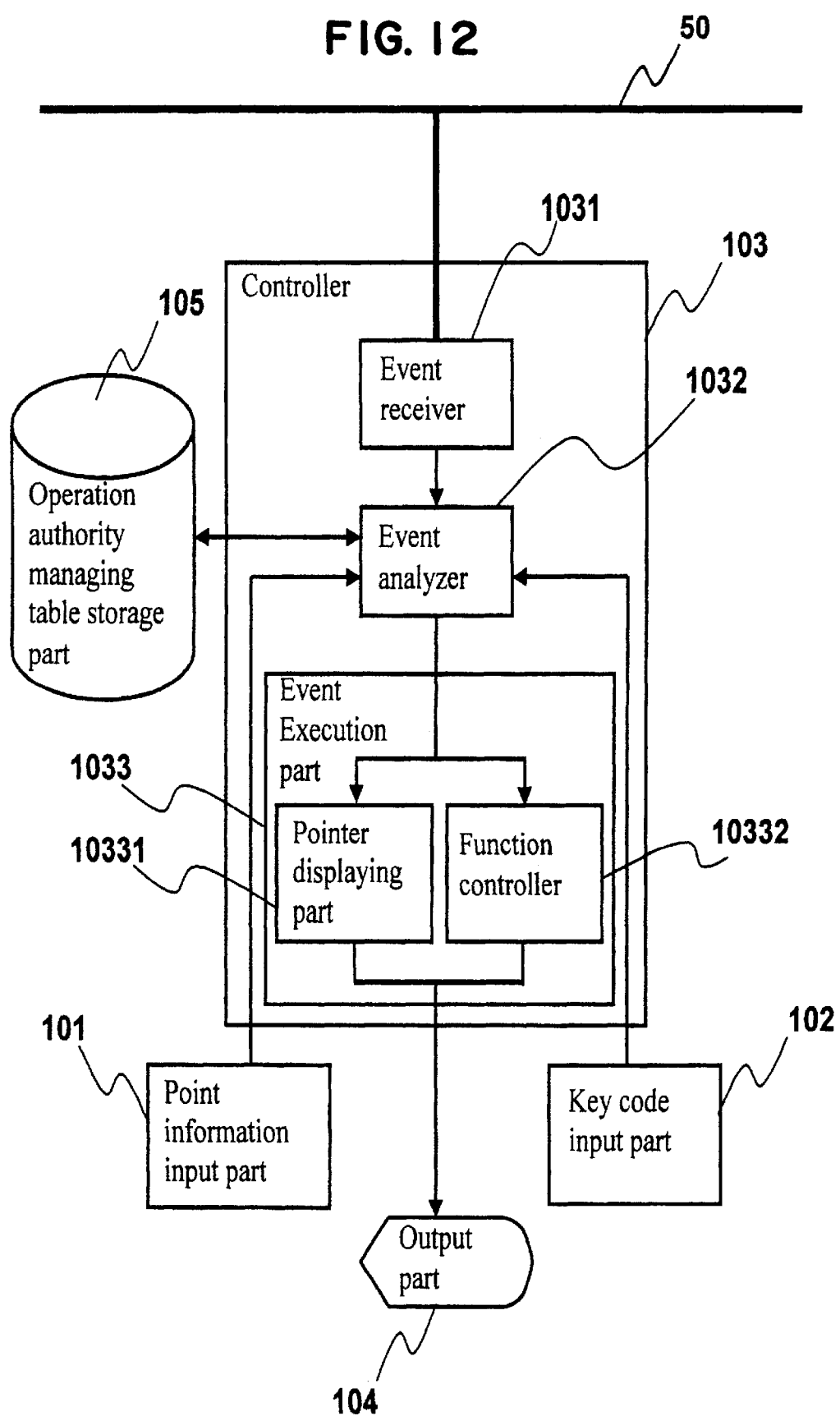
FIG. 12 is a block diagram showing the structure of an operated terminal according to a second embodiment of the present invention.

The terminal operation system of the second embodiment makes it possible for several attendants to use the pointer smoothly in an environment where several pointer operation authorities are assigned to the attendants at the same time. FIG. 12 is a block diagram illustrating the configuration of the operated terminal 10 of this embodiment. As shown in FIG. 12, the operated terminal 10 of this embodiment includes a pointer displaying part 10331 and a function controller 10332 as the event executing part 1033.

The pointer displaying part 10331 displays at least one pointer on the output part 104 of the operated terminal 10 according to the information for the coordinates of the pointer included in the event information. This pointer is different from the pointer which the OS (operating system) of the operated terminal 10 originally controls, and is displayed independently by the pointer displaying part 10331. Therefore, several pointers can be displayed at the same time when several pointer operation authorities are assigned to several terminals and used.

The function controller 10332 operates the operated terminal 10 by setting the value obtained from the event information to the functions that the OS originally provides. The functions used in this embodiment are a function for controlling the mouse event, the function for controlling the keyboard input event, and so on. In practice, Windows 95™ provides Mouse_Event, as a function for controlling the mouse event and Key_Event as a function for controlling the keyboard input event. The function controller 10332 displays a mouse pointer which the OS provides or displays characters according to the key code entered from the keyboard when the mouse operation authority or the complete operation authority and not for the pointer operation authority is used.

The event analyzer 1032 including above-mentioned unit analyzes the event information and outputs the event information to the pointer displaying part 10331 or the function controller 10332 and controls pointers etc.

The following describes particular processing on the operated terminal 10. FIG. 13 is a flow chart showing the processing procedures of the controller of the operated terminal which receives the event information according to a second embodiment of the present invention. As shown in FIG. 13, the process for receiving the event information (S1301) and process for determining the operation authority assigned to the operating terminal on the controller 103 of the present embodiment are the same as in the first embodiment.

After the process S1301, if the assigned operation authority of the operating terminal is the complete operation authority (S1302: No, S1304: Yes), all event information are transmitted to the function controller 10332 and performed on the operated terminal according to all transmitted event information. (S1303).

If the assigned operation authority is the mouse operation authority (S1302: No, S1304: Yes), the event analyzer 1332 determines whether the terminal to which the complete operation authority is assigned exists, as in the first embodiment (S1305). If there is no terminal to which complete operation authority has been assigned (S1305: No), all transmitted event information specified by mouse operation is transmitted to the function controller 10332. The function controller 10332 transmits the event information to the function for mouse event controller provided by the OS and the events related to the mouse operation are performed (S1306).

If there is a terminal to which complete operation authority has been assigned (S1305: Yes) or the pointer operation authority has been assigned to the operating terminal (S1304: No, S1307: Yes), the pointers are displayed on the output part 104 of the operated terminal by the event information transmitted to the pointer displaying part 10331 (S1308). As described above, several pointers can displayed simultaneously on the output display of the operated terminal because the pointer displaying by the pointer output display part 13301 can be performed simultaneously.

As described above, the multiple pointer function can be realized among several operating terminals by the above-mentioned process.

Embodiment 3

Next, a third embodiment of the present invention is described below. In this embodiment, a process showing who controls which pointer on the display of the operated terminal in an environment with multiple pointer functions as shown in the second embodiment is described.

As the configuration for the operating terminal of this embodiment, the configuration described in the FIG. 3 can be used. Specifically as described in the first embodiment, a user ID is entered on the operating terminal side using an input device such as the key code input part 302 of the operating terminal 30 and the entered user ID is stored in the operation terminal managing table. FIG. 14 is an example of the contents of an operation terminal managing table of this embodiment. FIG. 14(a) shows an example of the contents when one letter is stored as a user pointer identifier, FIG. 14(b) shows an example of the contents when the user ID is stored as a user pointer identifier and converted to one letter on the operated terminal side. In both above-mentioned cases, the user pointer identifier stored in the operation terminal managing table is transmitted as the user pointer identifier included in the event information described by FIG. 5(b) and FIG. 6(b).

Figure 15:
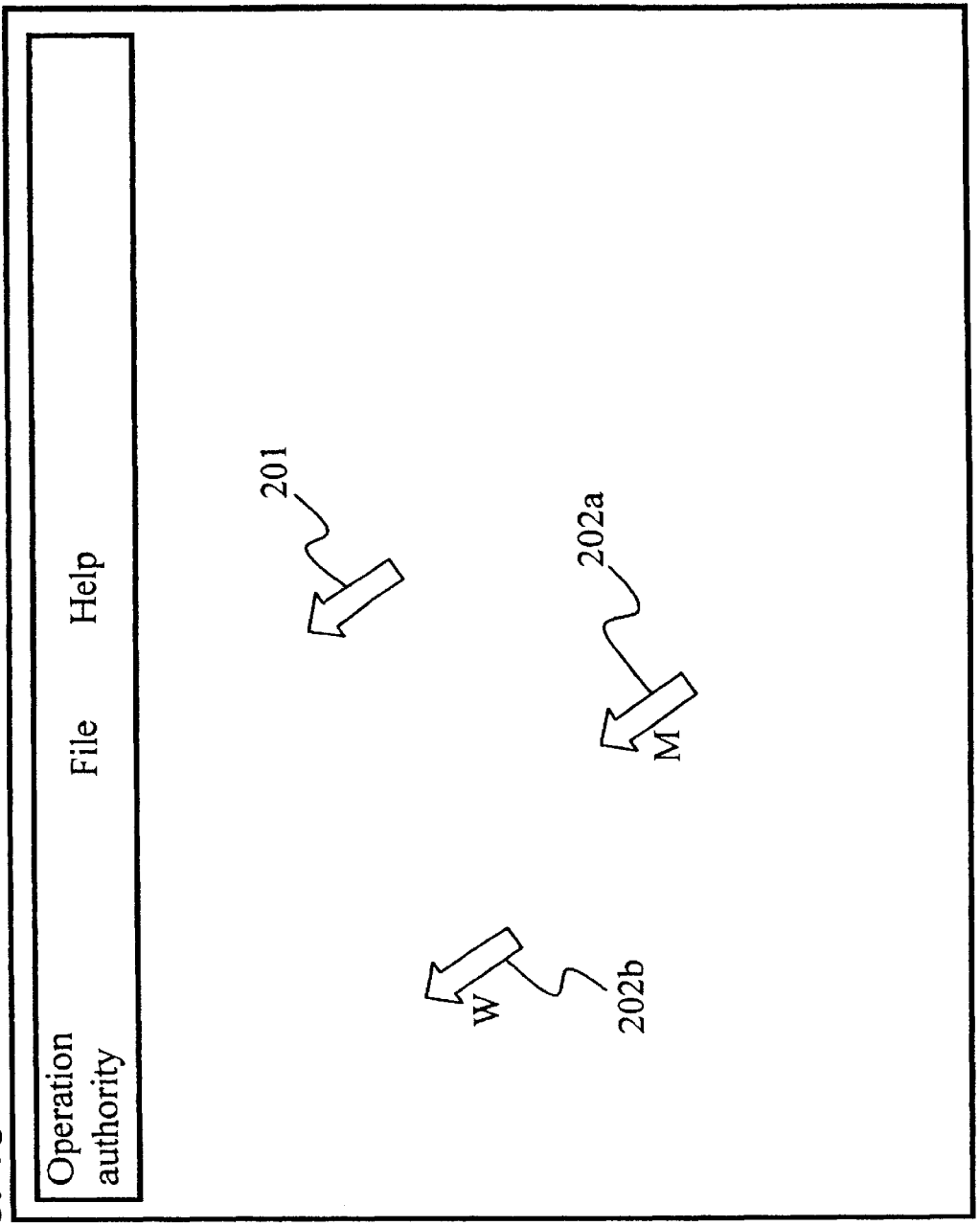
FIG. 15 is a diagram illustrating an example of a display where the multiple pointing function is realized according to a third embodiment.

FIG. 15 is a diagram illustrating an example of a display of the operated terminal 10 when the multiple pointing function is realized according to this embodiment. As shown in FIG. 15, when the multiple pointer function of this embodiment is realized, the pointer 202 and the pointer 202b, which are different in size from the pointer displayed by the pointer displaying part 10331, are displayed in addition to the pointer 201 displayed by the OS. The information which stands for the user is additionally displayed at the pointer 202 and the pointer 202b.

As described above, a means for storing the user pointer identifier is provided, the multiple pointer function is realized. Therefore, the pointers with the user pointer identifier are displayed simultaneously with the pointer displaying part 10331 and attendants can easily recognize the operator of each pointer.

In this embodiment, the case that the information for recognizing the user pointer identifier (such as one letter) is stored in the operating terminal side. This information can be stored in the operated terminal. This can be accomplished by storing the user ID managing table as shown in FIG. 16 in the pointer displaying part 10331 and converting the user ID into a letter when the user ID shown in FIG. 14(b) is transmitted from the operating terminal. Here, a letter can be entered via the key code input part 102 of the operated terminal 10.

As shown in FIG. 14(b), it is also possible to store the relationship between the terminal ID and the user pointer identifier which is displayed along with the pointer on the display.

Furthermore, in this embodiment, one letter is displayed together with the pointer as the user pointer identifier in practice. The present invention is not restricted to one letter for the user pointer identifier.

Embodiment 4

The following describes a fourth embodiment of the present invention is described. This embodiment relates to a method for adding the user pointer identifier to not only the pointer displayed by the pointer displaying part 10331 but also the pointer originally provided by the OS.

The configuration of the operated terminal 10 and the operating terminal 30 of this embodiment is the same as in the third embodiment. In the third embodiment, if the operating terminal obtains the complete operation authority or the mouse operation authority and operates the pointer originally provided by the OS of the operated terminal, the user pointer identifier is ignored, though the user pointer identifier is included in the event information transmitted from the operating terminal. However, in this embodiment, the user pointer identifier is added to the pointer originally provided by the OS of the operated terminal.

FIG. 17 is a flow chart showing the processing procedures of the controller of the operated terminal of this embodiment. As shown in FIG. 17, the terminal operation system of this embodiment can provide the following process in addition to the process described by FIG. 13. If the assigned operation authority of the operating terminal is the complete operation authority (S1702: Yes), or if the assigned operation authority of the operating terminal is the mouse operation authority and there is no terminal which has obtained the complete operation authority (S1705: Yes, S1706: No), the controller 103 of this embodiment provides the process by the function controller (S1703 and S1707) and the event information is transmitted to the pointer displaying part 10331 and the user pointer identifier is displayed near the pointer originally provided by the OS of the operated terminal (S1704). In this case, the pointer displaying part 10331 does not display the original pointer, and displays only user pointer identifier near the position specified by the coordinate information included in the event information.

The process as described above makes it possible to add the user pointer identifier to the pointer originally provided by the OS of the operated terminal.

Embodiment 5

The following describes the fifth embodiment of the present invention. This embodiment relates to a method for controlling the priority assignment when plural operation authorities of the plural terminals compete and the operation authority has layered levels, same as the first embodiment.

First of all, the process for controlling the priority for competing function is described. For example, when the operation authority has layered levels, and when the lower operation authority is used with the upper level operation authority, the upper operation authority and the lower operation authority cannot operate a function on the operated terminal simultaneously. This problem is called "function competing" in this embodiment. In practice, the mouse action under both the complete operation authority and the mouse operation authority, operate the pointer originally provided by the OS, so the mouse operation causes the function competing. Therefore, several operating terminals use the competing functions simultaneously, and the system should control assignment of the priority for utilizing that function to one of the operating terminals.

In the first embodiment, if the complete operation authority and the mouse operation authority compete, the priority is permanently assigned to the complete operation authority. However, in practice, it is not always preferable to fix the assignment of the priority to the complete operation authority.

For example, regarding electronic conferences, if the user who is administrator uses the keyboard, and the user who is the current speaker uses the mouse, the complete operation authority should be assigned to the user who is the administrator. However, regarding the mouse operation, it is preferable to assign the priority to the mouse operation authority assigned to the user who is the current speaker, and not to the complete operation authority.

Therefore, in this embodiment, the terminal operation system achieves flexible control for assigning the priority for the competing function when operation authorities, which cause function competing, are used simultaneously.

The configuration of the operated terminal 10 can be the same configuration as shown in FIG. 12. However, the event analyzer 1032 of this embodiment comprises a flag for storing the status of the system as described in the following.

Figure 18:
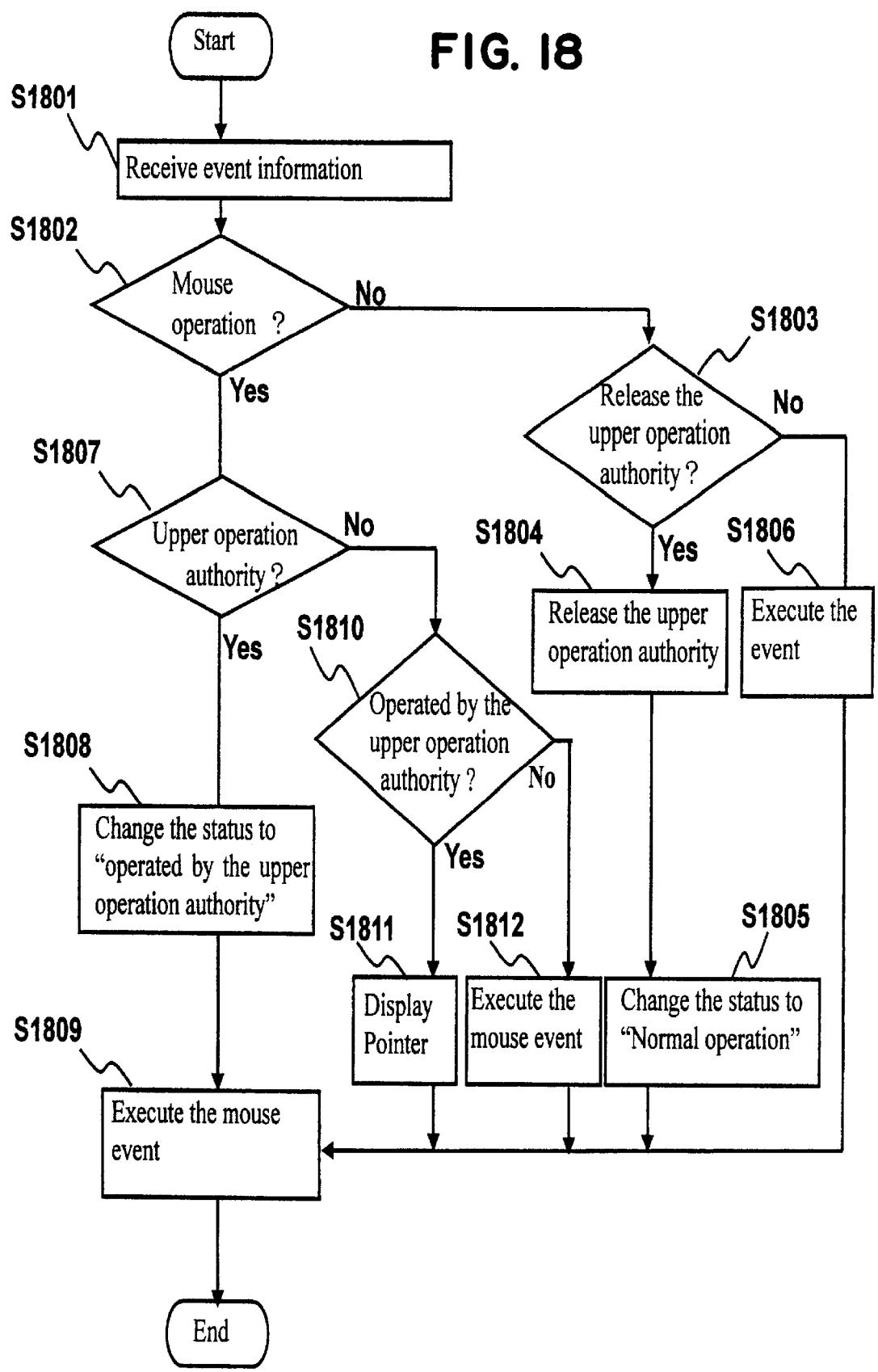
FIG. 18 is a flow chart showing the processing procedure of the controller of the operated terminal according to a fifth embodiment of the present invention.

FIG. 18 is a flow chart showing the processing procedures of the controller of the operated terminal for this embodiment. As shown in FIG. 18, the controller 103 of this embodiment receives the event information (S1801). It determines whether the event information relates to the mouse operation (S1802). In practice, it determines whether the event attribute of the event information shown in FIG. 5 to FIG. 7 relates to "pointer" or to "mouse".

If the event information does not relate to the mouse operation (S1802: No), the controller 103 decides that the event information indicates the release of the upper level operation authority (S1803).

The assignment and the release of the upper operation authority is described in the following. "Upper operation authority" means the higher authority for using the mouse function. Therefore, the availability of the mouse function is given priority by setting the upper operation authority described in this embodiment, even though the terminal to which the complete operation authority is assigned exists.

Figure 19:
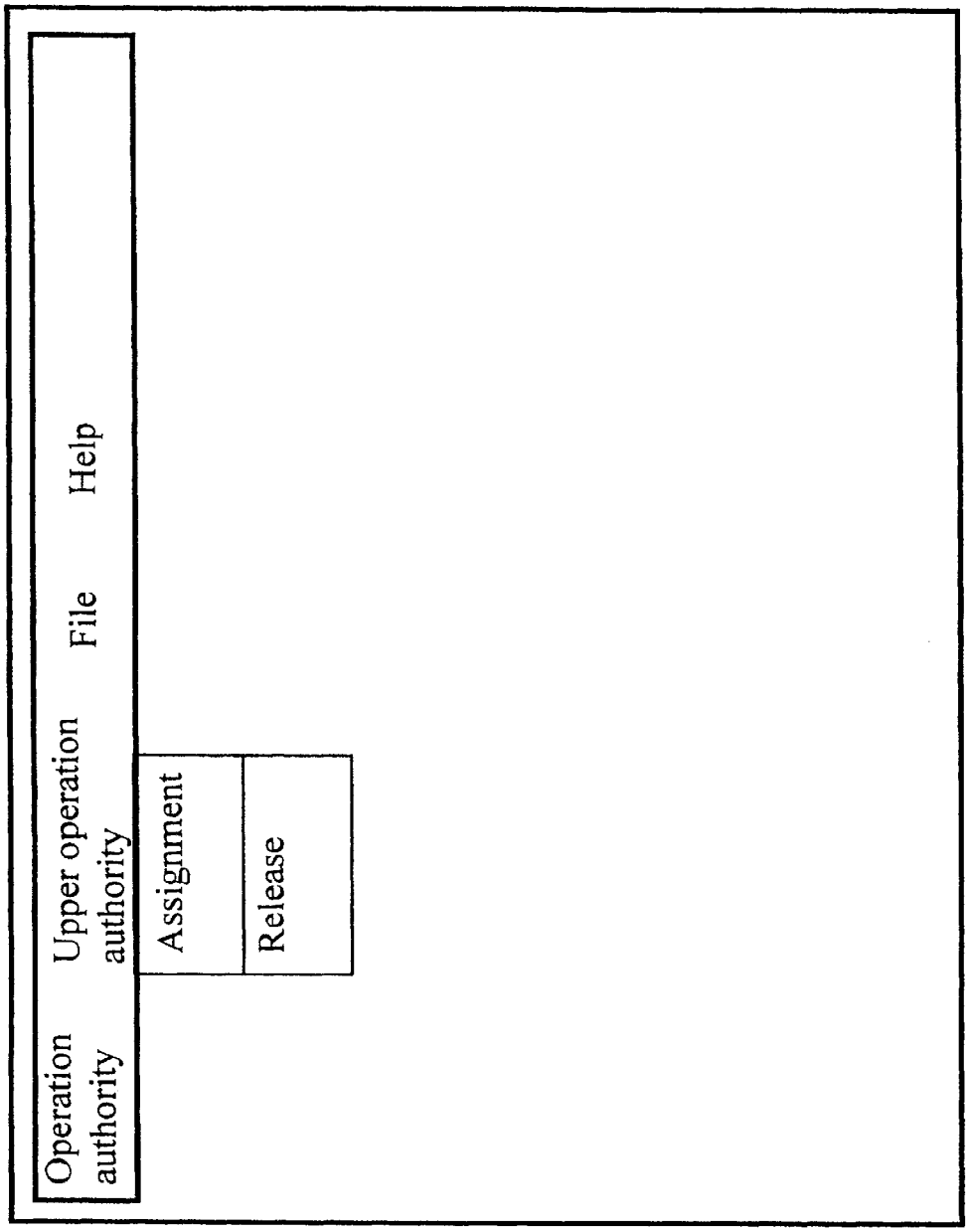
FIG. 19 is a diagram illustrating an example of the contents of a pull-down menu for setting or releasing the higher authority.

The assignment and the release of the upper operation authority can be specified by a pull-down menu such as shown in FIG. 19 displayed on the output part 304 of the operation terminal. In this embodiment, if the assignment or the release of the upper operation authority is set, information indicating that setting is stored in the operation authority managing table.

FIG. 20 is an example of the contents of an operation authority managing table of this embodiment. As shown in FIG. 20, the information which indicates whether the upper operation authority is set and stored in the operation authority managing table of the operating terminal.

If the entered information from the operating terminals indicates the release of the upper operation authority. (S1803: Yes), the event analyzer 1032 releases the upper operation authority set to the operation authority managing table (S1804), and changes the status to "Normal" (S1805). If the entered information indicates the setting of the upper operation authority, step S1803 becomes "No", and normal event, that is the upper operation authority setting, is performed (S1806). The normal event is also performed as the process except for the setting of the upper operation authority.

The status used in this embodiment described in the following. There are two kinds of status. One is "Normal", and the other one is "Operated by the upper operation authority". "Normal" means that the upper operation authority has not been assigned or the upper operation authority is not used, even though the upper operation authority has been assigned. That upper operation authority is not used means that mouse operation is not transmitted as events from the terminal to which the upper operation authority has been assigned.

On the other hand, "Operated by the upper operation authority" means that the mouse function is actually used with priority by the terminal to which the upper operation authority has been assigned as described below.

At step S1802, the controller 103 determines that the event relating the mouse operation is received (S1802: Yes), the controller 103 judges the received event relating the mouse operation is whether the input from the terminal to which the upper operation authority is assigned or not (S1807). The controller 103 can judge by comparing the information of the operation authority managing table and the operation terminal ID of the event information.

If the event information relating to the mouse operation from the terminal which the upper operation authority is assigned to is received (S1807: Yes), the event analyzer 1032 changes the status to "Operated by the upper operation authority" (S1808), the mouse event is performed according to the event transmitted from the operating terminal to which the upper operation authority is assigned (S1809).

If the event information relating to the mouse operation from the terminal to which the upper operation authority is not assigned is received (S1807: No), the controller 103 decides whether the status is the "Operated by the upper operation authority" (S1810). If the status is "Operated by the upper operation authority", the operating terminal to which the upper operation authority is assigned exists, and the operating terminal which performs mouse operation via the pointer provided by the OS exists. Therefore, the pointer displaying by the pointer displaying part 10331 for the operating terminal to which the upper operation authority is not assigned should be performed. Therefore, the status should be judged as "Operated by the upper operation authority".

Consequently, if the status is "Operated by the upper operation authority" (S1810: Yes), the pointer displaying is performed by the pointer displaying part 10331 (S1811). If the status is not "Operated by the upper operation authority" (S1810: No), the mouse event is performed according to the event information received from the operating terminal (S1812).

In the above-mentioned process, after the mouse operation is performed by the terminal to which the upper operation authority is assigned and the status becomes "Operated by the upper operation authority", the operating terminal to which the upper operation authority is assigned has the highest priority on the mouse operation authority until the assigned upper operation authority is released. In this case, the operating terminal to which the complete operation authority is assigned cannot perform the mouse function, but actually, the pointer operation authority is assigned by the pointer displaying part 10331. That means the alternative operation authority is assigned in a sense.

Furthermore, that the complete operation authority always has the highest priority for all functions is set in the judgement relating the upper operation authority at step S1807, step S1810 and so on. Alternative operation authority as a pointer operation authority can be assigned to the operating terminal which tries to perform the mouse function when the operating terminal to which the complete operation authority is assigned exists.

By the process as described above, flexible control for the operation authority assignment to the operating terminal can be possible under the status where the operation authority is layered into several levels. For example, if the operating terminal to which the complete operation authority is assigned exists, higher priority regarding the mouse function is assigned to another operating terminal, or if the operating terminal to which the upper operation authority is assigned exists, higher alternative operation authority is assigned to an operating terminal to which the lower operation authority is assigned.

Embodiment 6

Next, the sixth embodiment of the present invention is described below. In this embodiment, the operation authority has layered levels. If the operating terminal to which a lower operation authority is assigned tries to perform an upper level function, this terminal operation system can provide a method for changing the operating authority to the upper operation authority by detecting the event for the upper level function from the operating terminal. Here, "upper level function" means a function that can be performed by the upper operation authority.

More specifically, an example of an upper level function is when the operating terminal to which the pointer operation authority is assigned tries to perform a certain function by mouse click action.

In the fifth embodiment, as described above, the upper operation authority is set preliminary to the operating terminal to which the lower operation authority is assigned to be able to perform the specified function with high priority. However, restriction of the setting or releasing the upper operation authority to limited attendants may be inconvenient for the attendants in some cases.

For example, when many attendants actively try to make their presentation and remarks in the conference, it is more convenient for attendants to be able to perform the upper level function than to set the upper operation authority preliminarily, because then the conference may progress smoothly.

The terminal operation system of this embodiment allows the operating terminal to which the lower operation authority is assigned to perform the upper level function smoothly.

The configuration of the operated terminal 10 can as shown in FIG. 12.

Figure 21:
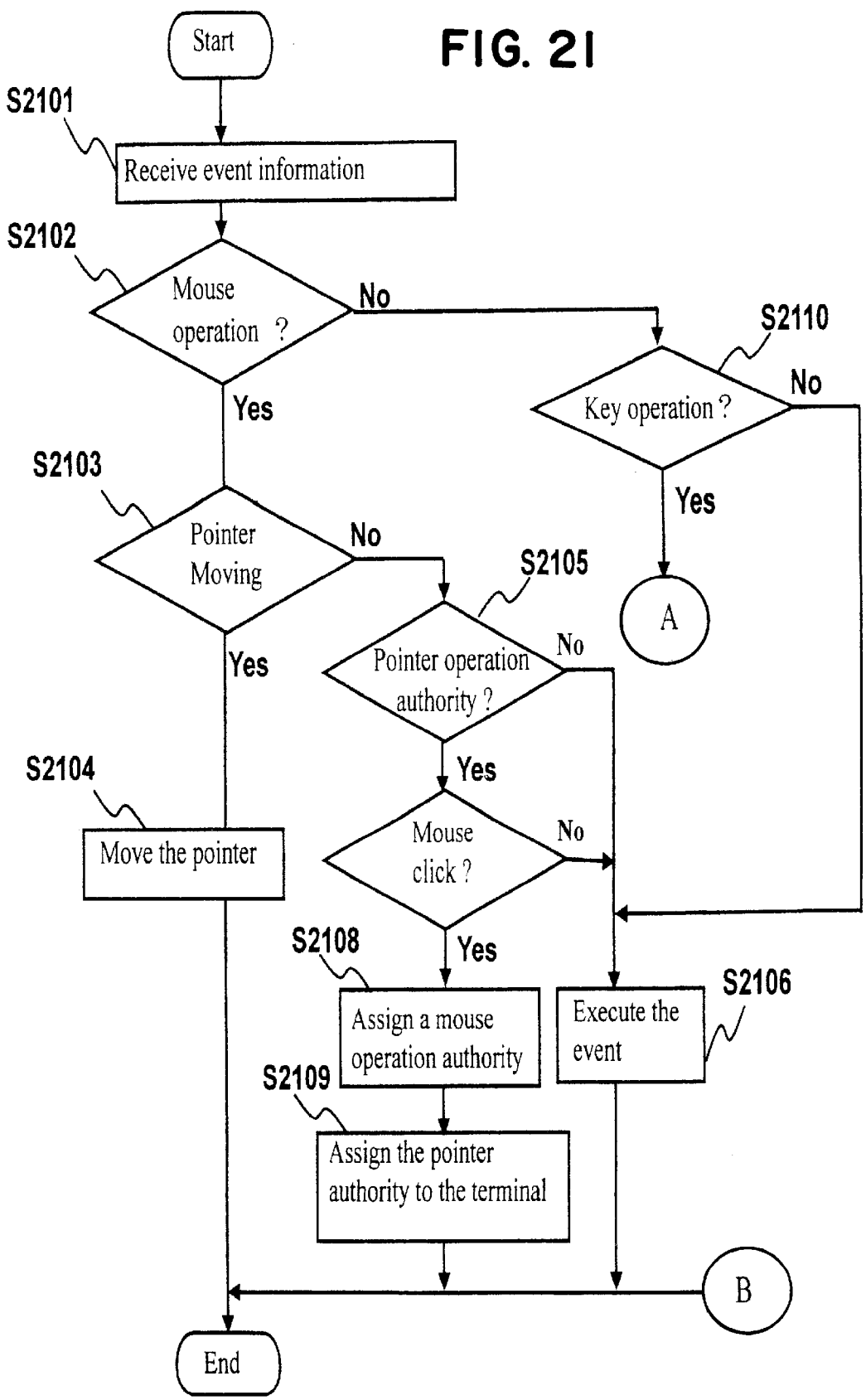
FIG. 21 is a flow chart showing the processing procedure of the controller of the operated terminal according to a sixth embodiment of the present invention.

FIG. 21 is a flow chart showing the processing procedures of the controller 103 of the operated terminal of this sixth embodiment.

As shown in FIG. 21, the controller 103 of this embodiment receives the event information (S2101), and determines whether the event information relates to the mouse operation (S2102). In practice, it decides whether the event attribute of the event information shown in FIG. 5 to FIG. 7 relates to "pointer" or to "mouse".

If the event information relates to the mouse operation (S2102: Yes), the controller 103 decides whether the event information indicates the pointer movement or not (S2103). If the event information indicates the pointer movement (S2103: Yes), a pointer moving operation is performed on the display (S2104). This means that if a multiple pointer function is performed, the pointer moving operation is performed by the pointer displaying part 10331 or the function controller 10332.

If the event information does not indicate the pointer movement (S2103: No), the controller 103 decides whether the pointer operation authority is assigned to the operating terminal (S2105). If the operation authority is not the pointer authority (S2105: No), the indicated event is performed on the operated terminal according to the transmitted event information (S2106).

If the operation authority is the pointer authority in the judgement process of the step S2105 (S2105: Yes), the controller 103 decides whether the transmitted event information has been entered by mouse click (S2107). In the terminal operation system of this embodiment, the mouse operation authority is assigned automatically to the operating terminal to which the pointer operation authority is assigned when mouse click action is performed on that operating terminal. Therefore, if the event is related to the mouse click action (S2107: Yes), the mouse operation authority is assigned to the operating terminal (S2108) and the pointer operation authority is assigned alternatively to the operation terminal to which the mouse operation authority or the complete operation authority was assigned before (S2109). In practice, the performed processes are, for example, the update of the content of the operation authority managing table, change of the pointer displaying by the pointer displaying part 10331 and the function controller 10332 and so on.

On the other hand, if the event information does not relates to the mouse operation (S2102: No), the controller 103 decides whether the transmitted event information is related to the keyboard operation (S2110).

If the transmitted event information relates to neither the mouse operation nor the keyboard operation (S2110: No), an appropriate event is performed according to the event information (S2106). If the transmitted event is related to the keyboard operation (S2110: Yes), the process is shifted to the process described by the flow chart shown in FIG. 22.

Figure 22:
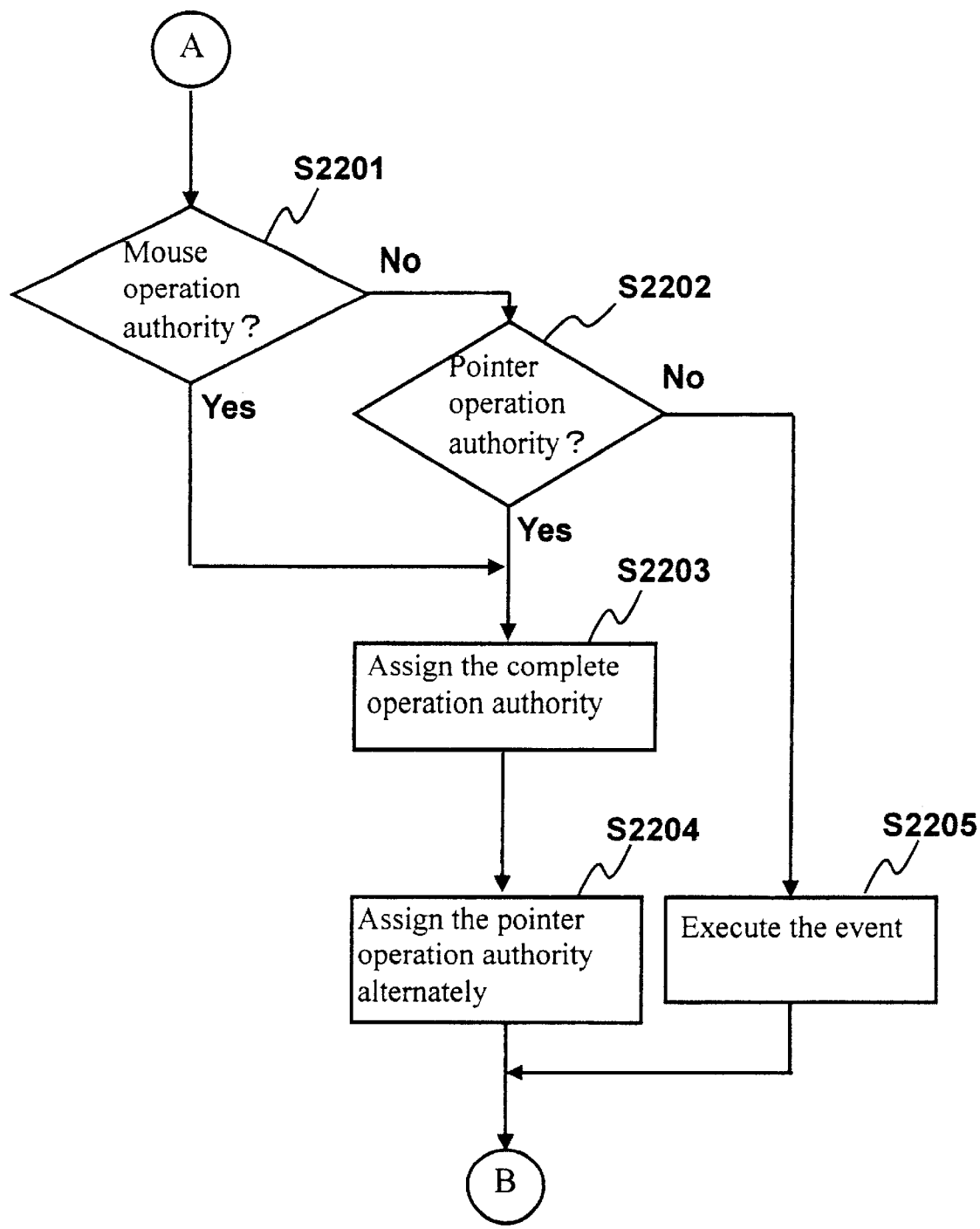
FIG. 22 is a flow chart showing the processing procedure of the controller of the operated terminal according to a sixth embodiment of the present invention.

As shown in FIG. 22, if the transmitted event is related to the keyboard operation (S2110: Yes), first of all, the controller 103 decides whether the operation authority assigned to the operating terminal that has transmitted the keyboard operation is the mouse operation. This judgement is made by referencing the operation authority managing table (S2201). If the assigned operation authority is not the mouse operation authority (S2201: No), the controller 103 determines whether the assigned operation authority is the pointer operation authority (S2202).

If the assigned operation authority is the mouse operation authority (S2201: Yes), or the pointer operation authority (S2201: No, S2202; Yes), the complete operation authority is assigned to the operating terminal (S2203), and the pointer operation authority is assigned alternatively to the operation terminal to which the complete operation authority was assigned before (S2204). In practice, the performed processes are, for example, the update of the content of the operation authority managing table, change of the pointer displaying by the pointer displaying part 10331 and the function controller 10332, and so on.

If the assigned operation authority is neither the mouse operation authority nor the pointer operation authority (S2202: No), an appropriate event is performed according to the event information (S2205), and the procedure returns to the step described by the flow chart shown in FIG. 21.

Here, the content of the operation terminal managing table is updated on the operating terminal (this is not shown in figure), because, if the mouse click action is performed on the operating terminal to which the pointer operation authority has been assigned until then, the operation authority attribute stored in the operation terminal managing table is updated to the mouse operation, and transmission of the event information of the mouse click is started. If a keyboard operation is performed, the operation authority attribute stored in the operation terminal managing table is updated to the complete operation authority, and the transmission of the event information of the key operation is started.

By the process as described above, operation authority update can be performed smoothly when the operating terminal to which the lower operation authority is assigned tries to perform an upper level function.

Embodiment 7

The following describes a seventh embodiment of the present invention. This embodiment relates to a method for controlling the priority for retaining the upper operation authority according to the process for obtaining it.

In practice, if there is an operating terminal having the complete operation authority obtained by utilizing the pull-down menu shown in FIG. 10, and another operating terminal obtains the complete operation authority by the keyboard operation described in the sixth embodiment, the terminal operation system in this seventh embodiment controls the priority for retaining the operation authority according to the process to obtain the operation authority. More specifically, when the operating terminal which has obtained the complete operation authority by keyboard operation releases the obtained complete operation authority, the system will automatically assign the complete operation authority again to the operating terminal which has had the complete operation authority by utilizing the pull-down menu before.

The configuration of the operated terminal 10 can be the same configuration as shown in FIG. 12. However, in this seventh embodiment, information for the operation authority reassignment should be included in the operation authority managing table, because it is necessary to recognize the operating terminal to which the complete operation authority should be reassigned when the complete operation authority is released by the operating terminal which currently has the complete operation authority.

FIG. 23 is an example of the contents of an operation authority managing table of the seventh embodiment. As shown in FIG. 23, the operation authority managing table of this embodiment stores information such as the operating terminal ID, the operation authority attribute assigned to each operating terminal, and in addition to that, the complete operation authority flag, the mouse operation flag and so on. In FIG. 23, the complete operation authority flag corresponding to the operating terminal 30 is "ON". This means that the operating terminal 20 has obtained the complete operation authority by keyboard operation while the operating terminal 30 has obtained and retained the complete operation authority by utilizing the pull-down menu. Regarding the mouse operation flag, the same configuration is possible as with the complete operation authority flag. By the above-mentioned process, the event analyzer 1032 of this embodiment automatically reassigns the complete operation authority to the operating terminal 30 when the operating terminal 20 releases the complete operation authority.

In this embodiment, if the operation authority is transitioned by keyboard operation, the content of the operation authority managing table of the operating terminal having the upper operation authority will not be updated so the event information corresponding to the complete operation authority is transmitted from the operating terminal 30. Therefore, the operated terminal ignores all event information except for the pointer information. Accordingly, to assign the complete operation authority again to the operating terminal 30, the controller 103 of the operated terminal 10 updates the content of the operation terminal managing table and accepts all event information transmitted from the operating terminal 30 which had been ignored before and performs the specified event.

Here, the content of the operation authority managing table of the operating terminal side could be updated instead of the operated terminal side as described above. The operating terminal updates the content of the operation terminal managing table according to the transmitted information from the operated terminal for re-assignment of the complete operation authority.

By the process as described above, it is possible to re-assign the complete operation authority to the operating terminal which had obtained the complete operation authority by utilizing the pull-down menu before the operating terminal which has obtained the complete operation authority by keyboard operation releases the complete operation authority. Therefore, the terminal operation system in this embodiment can provide the method for controlling the priority for retaining the upper operation authority according to the process for obtaining it.

Embodiment 8

The following is a description of the eighth embodiment of the present invention. This embodiment relates to a the method for restricting the acceptable number of the mouse click operations to one for each attendant.

During the electronic conference, an attendant who operates the pointer by his assigned pointer operation authority may demand to change the page of the shown document. Therefore, it is convenient for the attendant to be permitted to use the mouse click once. In this case, the upper operation authority such as the mouse operation authority is not needed for a long period. In this eighth embodiment, a method for controlling permits the operating terminal having the pointer operation authority to use the mouse function by combination of mouse action "button down" and "button up".

The configuration of the operated terminal 10 can be the same configuration as shown in FIG. 12.

Figure 24:
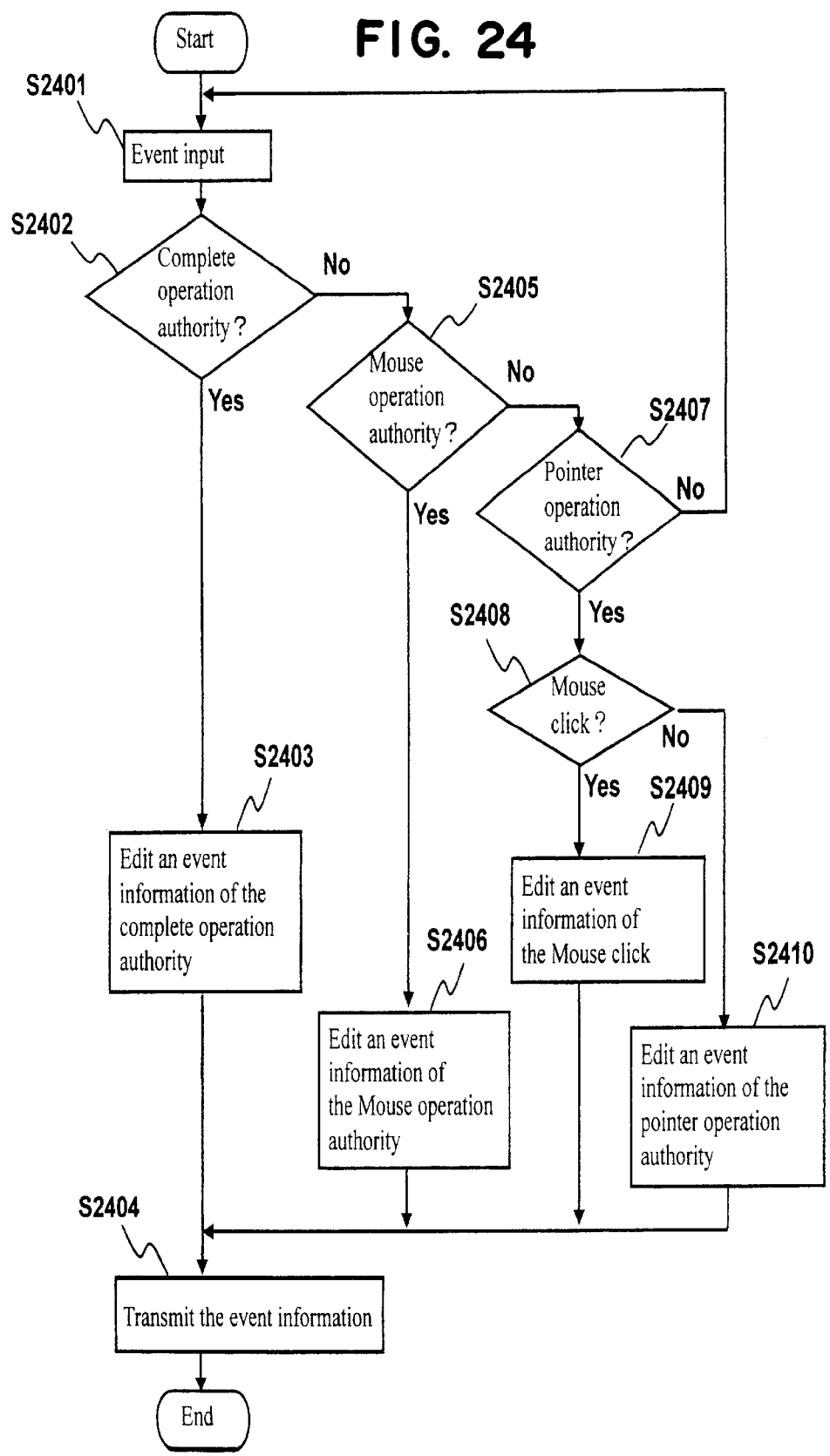
FIG. 24 is a flow chart showing the processing procedures of the controller of the operating terminal according to an eighth embodiment of the present invention.

FIG. 24 is a flow chart showing the processing procedures of the controller 103 of the operating terminal of this eighth embodiment. As shown in FIG. 24, the process of the controller 103 of this eight embodiment described as step S2401 to step S2406, is basically the same as the process described as step S801 to step S806 in FIG. 8 in the first embodiment.

However, the following process is different: If the assigned operation authority is the pointer operation authority (S2407: Yes), the controller 103 determines whether the event is a mouse click (S2408). If the event is a mouse click (S2408: Yes), the event information which indicates the mouse click is generated (S2409), and transmitted to the operated terminal (S2404). On the other hand, if the event is not a mouse click (S2408: No), the event information corresponding to the pointer operation authority is generated as in normal process (S2410) and transmitted to the operated terminal (S2404).

By the process as described above, it is possible to permit the operating terminal having the pointer operation authority to use the mouse function when the mouse action is a combination of "button down" and "button up".

Embodiment 9

The following describes the ninth embodiment of the present invention. In this embodiment, a method for erasing the pointer which has not moved for a certain period is described.

When the multiple pointer function is activated, continuous displaying of the pointer which the attendant does not intend to use anymore may be a problem for other attendants to make their presentation and remarks smoothly. Therefore, it is convenient to have a function for erasing such pointers from the display automatically. In this embodiment, the method for erasing the pointers which has not moved for a certain period is described in the following.

The configuration of the operated terminal 10 can be the same as shown in FIG. 12. However, in this ninth embodiment, a software timer to measure time for no operation for the pointer to move is included in the pointer output part 10331 because it is necessary to provide a means for that measurement. The pointer does not recognize the operating terminal to which the complete operation authority should be reassigned if the complete operation authority is released by the operating terminal which currently has the complete operation authority.

Figure 25:
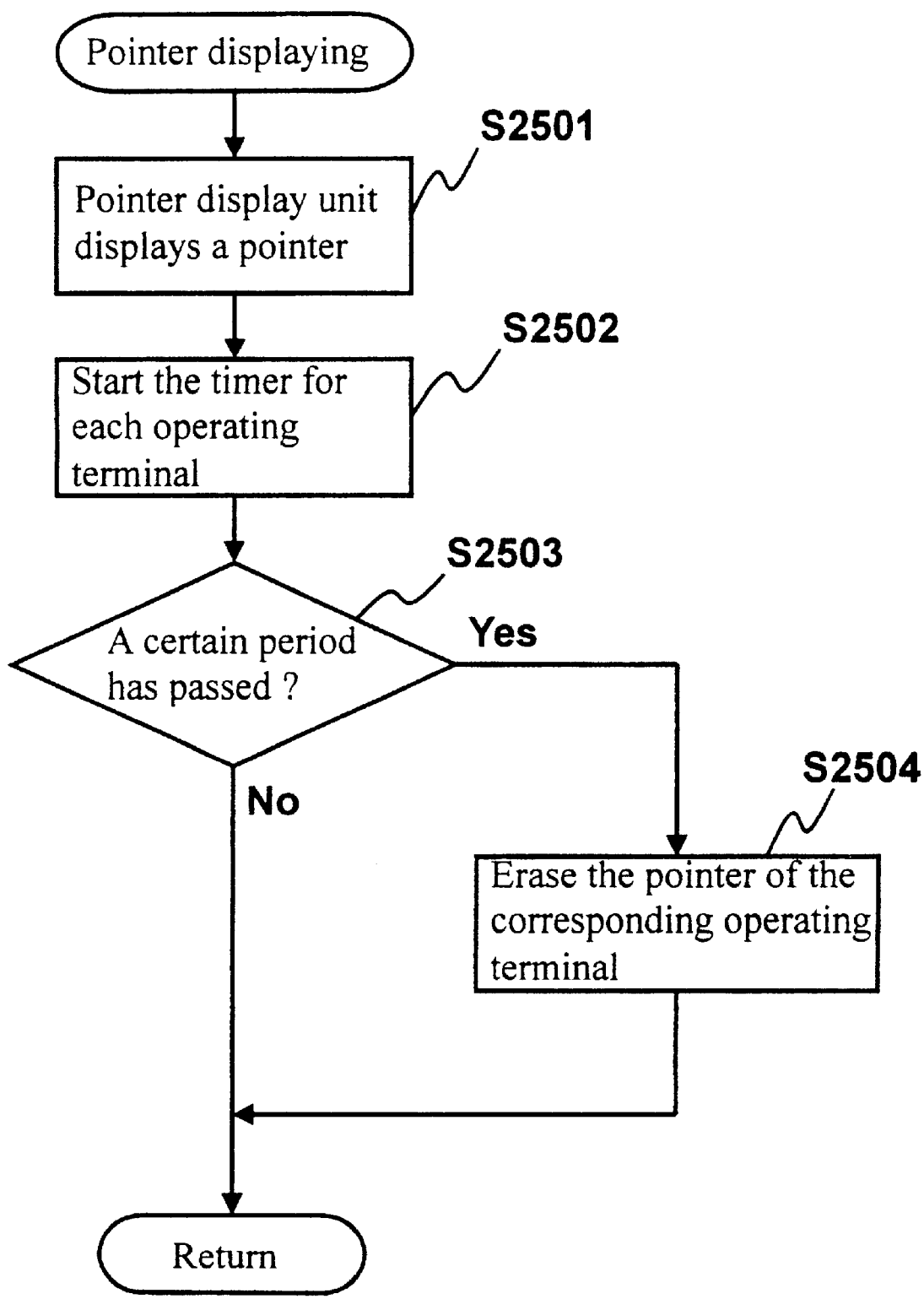
FIG. 25 is a flow chart showing the processing procedure of the controller of the operated terminal according to a ninth embodiment of the present invention.

FIG. 25 is a flow chart showing the processing procedures of the pointer displaying processing by the pointer displaying part 10331 of the operated terminal of the ninth embodiment. The processing described in this embodiment and shown in FIG. 25 corresponds to the detail processing step S1709 of the flow chart shown in FIG. 17 for displaying the pointer by the pointer displaying part 10331.

As shown in FIG. 25, in this embodiment, the pointer displaying part 10331 displays a pointer (S2501), and the software timer starts to count for each operating terminal (S2502).

Next, the pointer displaying part 10331 determines the counted time up to the preset time (For example, 15 seconds) at step S2503. If the counted time reaches the preset time (S2503: Yes), the pointer corresponding to the timer is erased (S2504).

By the process as described above, it is possible to erase the pointer which is not operated for the preset time from the display. In the above processing, it is preferable that the pointer originally provided by the OS is not erased in this embodiment.

Embodiment 10

The following describes a tenth embodiment of the present invention. This embodiment relates to a method for assigning the operation authority more smoothly when plural operating terminals try to obtain the operation authority.

For example, when nobody has obtained the operation authority during the electronic conference, plural operating terminals may compete simultaneously for the assignment of operation authority when the discussion heats up. In that case, it is not always preferable to assign the upper operation authority to the terminal which serves the request first. The terminal operation system in this tenth embodiment, can assign the operation authority smoothly in that case.

Figure 26:
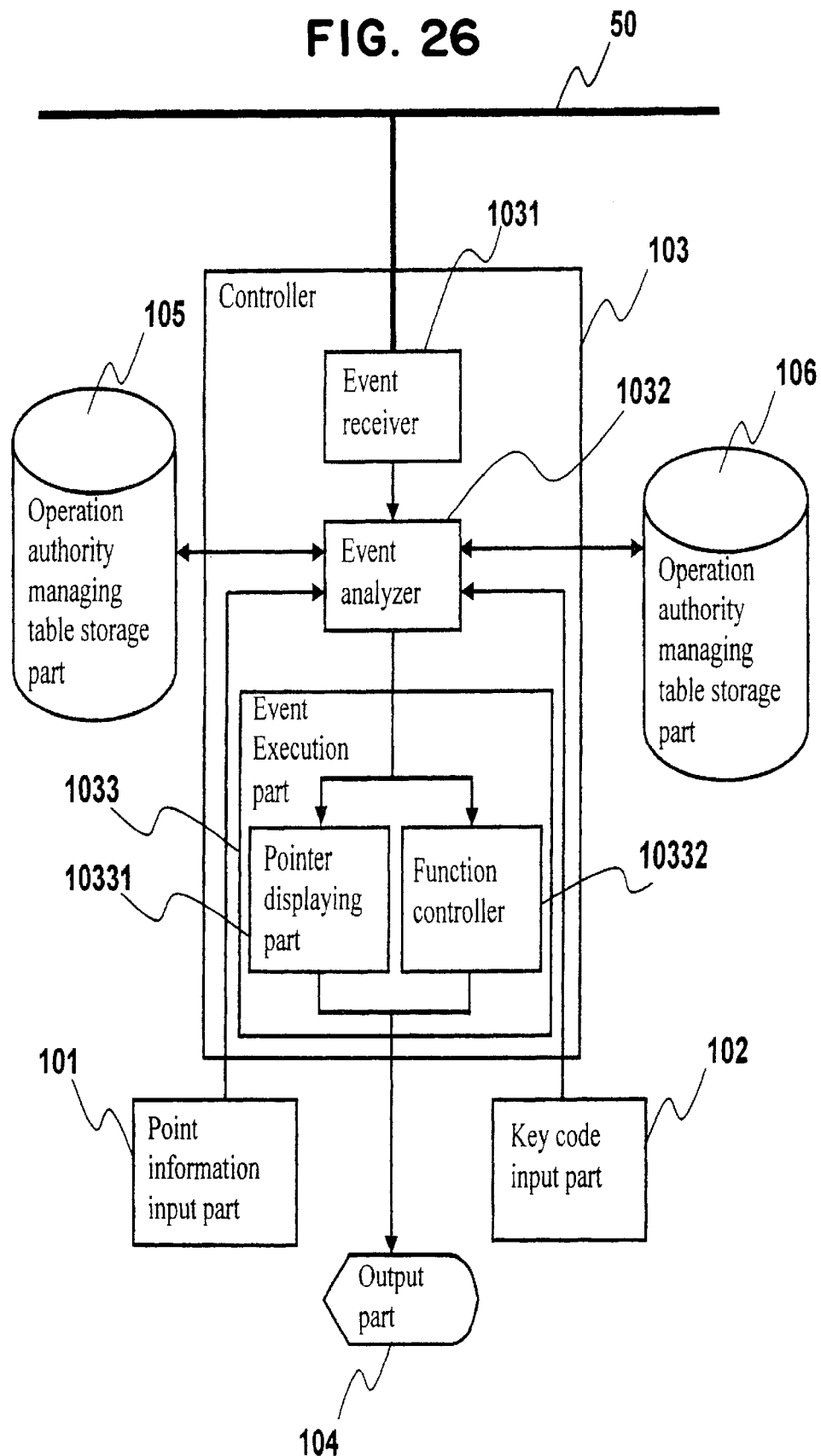
FIG. 26 is a block diagram showing the structure of an operated terminal according to a tenth embodiment of the present invention.

FIG. 26 is a block diagram showing the structure of an operated terminal of this tenth embodiment. As shown in FIG. 26, the terminal operation system of this tenth embodiment comprises the operation authority transition status managing table storage part 106 in addition to the configuration shown in FIG. 12.

The operation authority transition status managing table is stored in the operation authority transition status managing table storage part 106. The content of the operation authority transition status managing table is described in detail further below. The operating terminal ID of the operating terminal that requests assignment of the operation authority during the transition of the operation authority is stored sequentially to the operation authority transition status managing table storage part 106. The following description in this tenth embodiment, operation authority does not have layered levels and the only complete operation authority exists as an operation authority. However, if the assignment of the mouse operation is permitted, this system can also be applied by storing the operating terminal ID, to which a different operation authority is assigned or which tries to obtain a different operation authority to the operation authority transition status managing table.

"Operation authority transition status" in this tenth embodiment means the status in a predetermined period when no operating terminal has obtained the operation authority and an operating terminal requests the assignment of the operation authority. In particular, the status means that the system is in a process for assigning the operation authority and no operating terminal has definitely obtained the operation authority.

This means, when several operation terminals request the operation authority within the period for the operation authority transition status, one operating terminal is selected as the operating terminal to which the operation authority is assigned by a certain method. There are several methods for selecting the operating terminal to be assigned, in this embodiment, the method for assigning the operation authority to the operating terminal whose pointer has the largest movement in a certain period in the operation authority transition status is described in the following.

In this embodiment only the complete operation authority exists as the operation authority, so the operation authority transition status is defined as the status in a predetermined period when no operating terminal has obtained the operation authority and an operating terminal requests the assignment of the operation authority. However, the operation authority transition status can be defined as the case that there are operating terminals which already have obtained the operation authority and other terminals try to obtain the operation authority. In particular, the operation authority transition status can be defined as the case that other operating terminals try to obtain the complete operation authority even though there is a operating terminal having the mouse operation authority.

FIG. 27 is an example of the contents of an operation authority transition status managing table of this tenth embodiment. As shown in FIG. 27, the information for the operating terminal which has requested the operation authority and the information for the maximum pointer movement in a certain period for each operating terminal respectively are sequentially stored in the operation authority transition status managing table. The processing of the operated terminal having the operation authority transition status managing table shown in FIG. 27 is described in the following.

Figure 28:
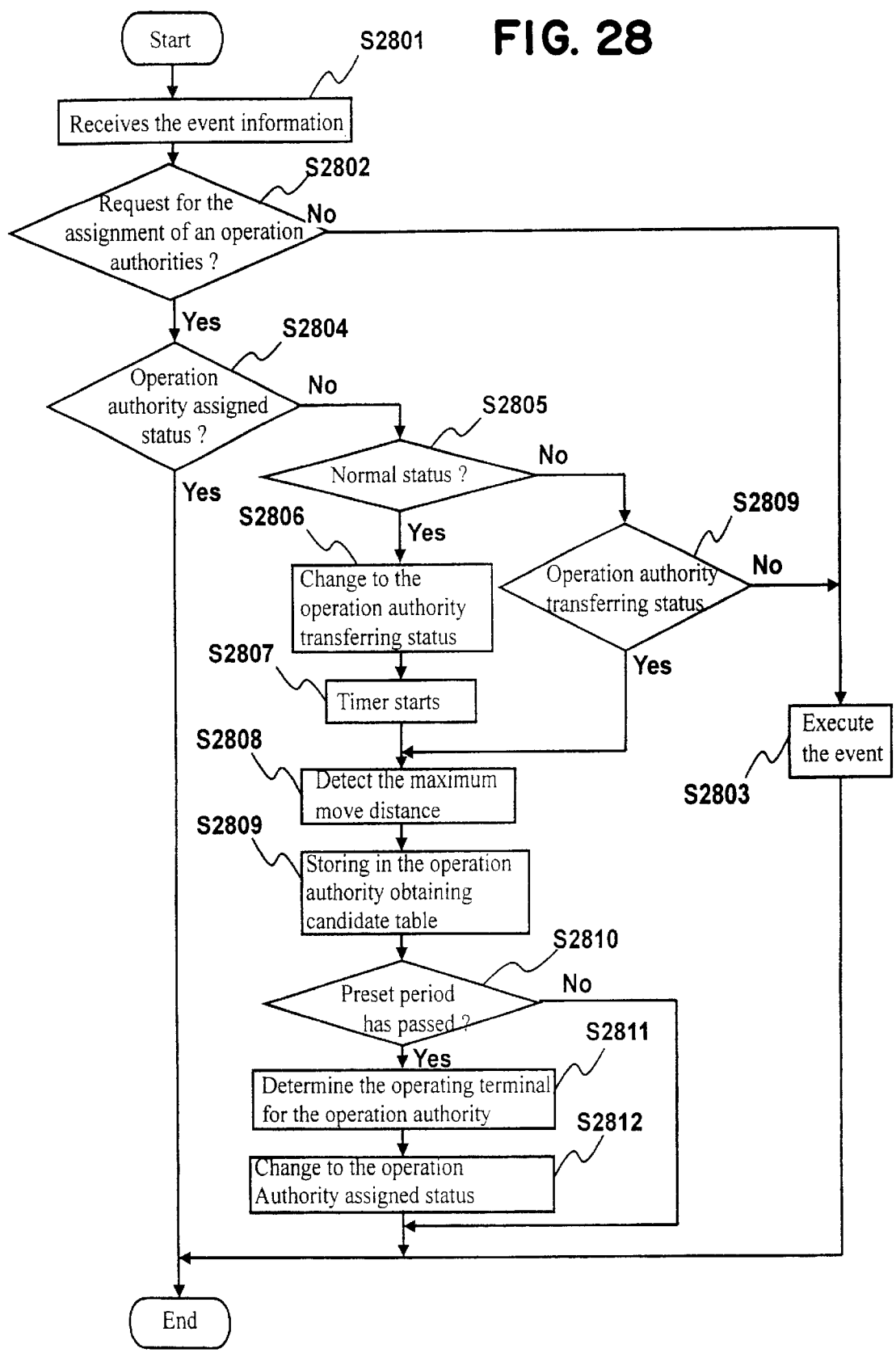
FIG. 28 is a flow chart showing the processing procedures of the controller of the operated terminal according to a tenth embodiment of the present invention.

FIG. 28 is a flow chart showing the processing procedures of the controller 103 of the operated terminal of this tenth embodiment. Here, the controller 103 comprises a flag for indicating whether the system is in the operation authority transition status. More specifically, the flag stores the information indicating one of the status, these are the "Normal status (No operating terminal obtains the operation authority)", "Operation authority transition status (the operating terminals which try to obtain the operation authority entry the request into the above-mentioned operation authority transition status managing table)", "Operation authority assigned status (a certain operating terminal has obtained the operation authority)".

As shown in FIG. 28, the controller 103 receives the event information (S2801), and determines whether the event information is the event indicating the request for obtaining the operation authority (S2802). If the information is not the event indicating the request for obtaining the operation authority (S2802: No), the indicated event is performed as usual (S2803).

If the information is the event indicating the request for obtaining the operation authority (S2802: Yes), the controller 103 determines whether the status is the operation authority assigned status (S2804). If the status is the operation authority assigned status (S2804: Yes), the status is kept as it is. If the status is not the operation authority assigned status (S2804: No), the controller 103 determines whether the status is the "normal status" (S2805). If the status is the normal status (S2805: Yes), the controller changes the status to the operation authority transition status (S2806) and activates the timer (S2807). This timer measures the time for the operation authority transition status. For example, in this embodiment, the operation authority transition status can be retained for 3 seconds. During 3 seconds, one of the terminals which request assigning the operation authority is determined as the terminal to which the operation authority is assigned.

Then, the maximum pointer moving distance of each operating terminal which requests assignment of the operation authority is calculated (S2808), then the operating terminal ID and the calculated maximum pointer moving distance is stored in the operation authority obtaining candidate table (S2809).

The method for calculation of the maximum pointer moving distance is described in the following. The reason why the assignment of the operation authority is determined based on the maximum pointer moving distance is based on the idea that the operation authority is assigned to the operating terminal which moves the mouse most intensely and moves the pointer the longest distance in a constant period after requesting of the operation authority. In other words, the terminal operation system of this embodiment applies the idea that the operation authority assignment is determined based on the strength of the intention to obtain the operation authority, not simply on the order of transmitting the request for operation authority assignment. To be specific, for a certain period, the pointer will move intensely on the display by that mouse action to obtain the operation authority, and the operating terminal whose pointer moving is the most intense or covers the longest distance will obtain the operation authority.

After step S2809, when the period for the operation authority transition status counted by the time which was activated at step S2807 has passed (3 second in this embodiment) (S2810: Yes), the operating terminal to which the operation authority is added is determined (S2811). FIG. 29 is a diagram illustrating a content of events and processing of an operation authority transition status of this tenth embodiment. In this embodiment, as shown in FIG. 29, the operation authority transition status is continued for 3 seconds. It is assumed that no operating terminal have the operation authority, the maximum pointer moving distance of the operating terminal 20 is initialized to "0". The operation authority transition status starts from the time when the controller 103 receives the request for assignment of the operation authority from the operating terminal 20 (0.0 second). 0.5 second later, the pointer moving distance of the operating terminal 20 for this 0.5 second is stored in the maximum pointer moving distance table as the maximum pointer moving distance. In this case, the pointer moving distance of the operating terminal 20 for this first 0.5 second is "50", so the value "50" is stored as the maximum pointer moving distance (at 0.5 second).

Regarding a further 0.5 second, the pointer moving distance for this 0.5 second, that is from 0.5 second to 1.0 second, is calculated. If the calculated pointer moving distance of the operating terminal 20 is larger than the maximum pointer moving distance stored in the maximum pointer moving distance table, the stored value is updated. However, in this example, the stored value is not updated because the above-mentioned condition is not satisfied. Here, in this period, the operating terminal 30 transmits the request for assignment of the operation authority. Therefore, the pointer moving distance of the operating terminal 30 in the maximum pointer moving distance table is initialized to "0" (at 1.0 second).

Regarding a further 0.5 second, the pointer moving distance for this 0.5 second, that is from 1.0 second to 1.5 second, is calculated. In this period, both the pointer moving distance of the operating terminal 20 and the operating terminal 30 are calculated, and compared with the value stored in the maximum pointer moving distance table respectively. If the calculated pointer moving distance of the operating terminal is larger than the maximum pointer moving distance stored in the maximum pointer moving distance table, the stored value is updated. Here, the maximum pointer moving distance of the operating terminal 30 is updated (at 1.5 second).

The same processing described, above is performed for 0.5 second each and the processing is stopped at 3 second. In this example shown in FIG. 29, both maximum pointer moving distances of the operating terminal 20 and the operating terminal 30 have been updated by the value calculated in the period from 2.5 second to 3.0 seconds. Other than the operating terminal 20 and the operating terminal 30, no operating terminal has not requested the assignment of the operation authority within 3 seconds. Final values of the maximum pointer moving distance are "60" for the operating terminal 20 and "75" for the operating terminal 30. Therefore, as the result of the determination of the operating terminal to be assigned the operation authority based on this final value, the operating terminal 30 obtains the operation authority even though its request for assignment of the operation authority had transmitted later.

As described above, when the operating terminal to which the operation authority is assigned is determined, the status is changed to "Operation authority assigned status" (S2812), then the processing ends.

By the process as described above, it is possible to assign the operation authority to the attendant who has the strongest intent to obtain the operation authority, not to the attendant who requests first. By this processing, the assignment of the operation authority can control smoothly.

In the above description, the operating terminal to which the operation authority is assigned is determined according to the maximum pointer moving distance, it is possible to utilize other information. In particular, following information such as, the number of mouse click actions, and the total pointer moving distance. Furthermore, if an information for preset priority order among users is stored in a table in advance, then the system can determine the operating terminal by referencing that information.

Normally, the operating terminal which obtains the operation authority tries to operate certain function for a while. Therefore, it is preferable that the operation authority cannot be obtained by other operating terminals for a certain period after the status turning to the "operation authority assigned status". In particular, to achieve that control, the requests for assignment the operation authority transmitted from other operating terminal is ignored for a certain time.

The above-mentioned process for determining the operation terminal to which the operation authority is assigned can be made as a module and can be called from the main program.

Embodiment 11

The following describes the eleventh embodiment of the present invention. This embodiment, the method for transferring or lending the operation authority among the operating terminal is described.

As we can understand from the above-mentioned embodiment, in the electronic conference, if the terminal operation system can provide the function for transferring or lending the operation authority from the operating terminal having the operation authority to other operating terminal, in addition to the function for responding the request for assignment of the operation authority from the operating terminal, it is convenient for users. For example, the chairman can lend the operation authority to other operating terminal temporarily, or the current speaker having the operation authority can transfer the operation authority to other operating terminals when the speakers take turns. In this embodiment, the terminal operation system which can deal with such a situation is described.

Figure 30:
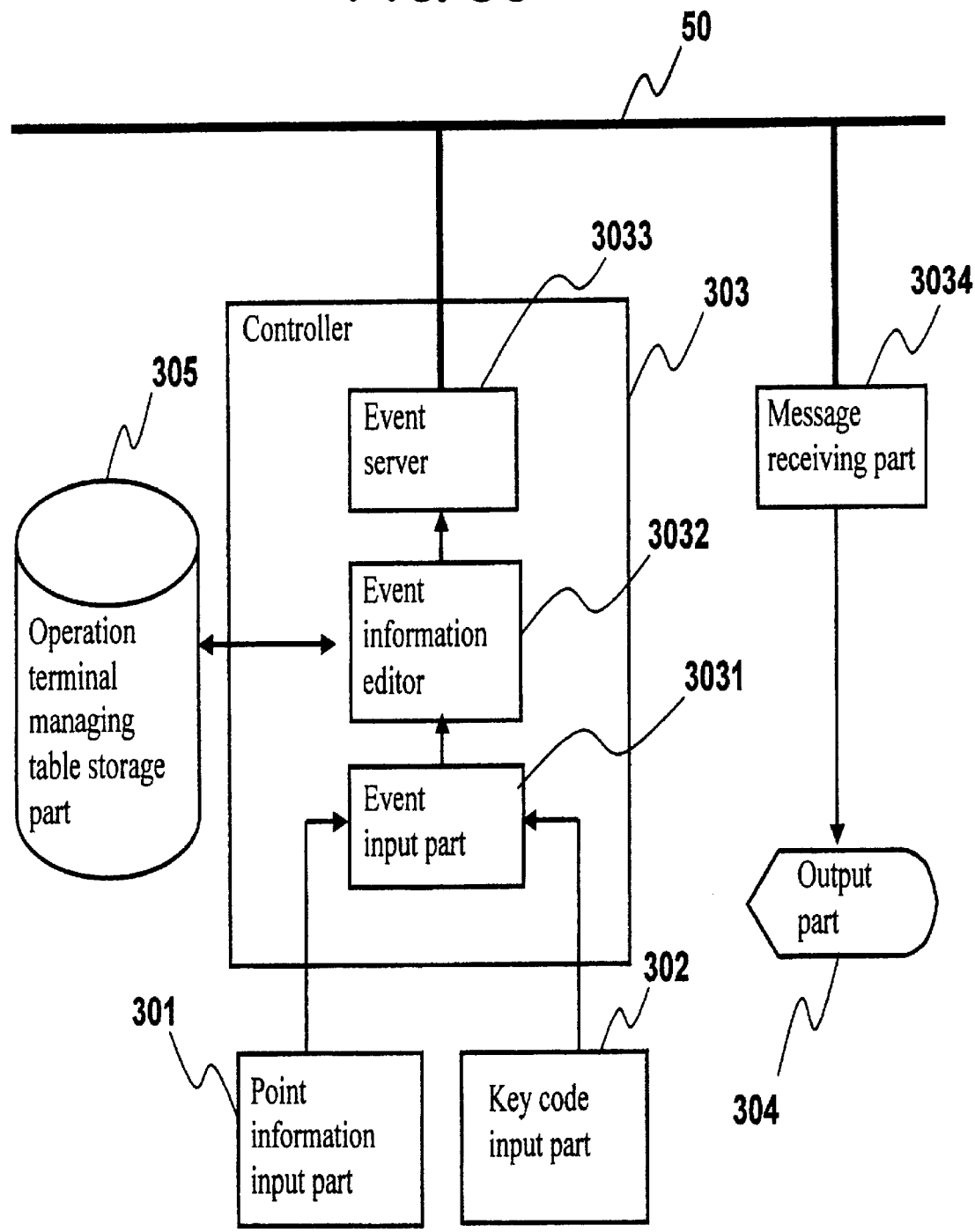
FIG. 30 is a block diagram showing the structure of an operating terminal according to an eleventh embodiment of the present invention.
Figure 31:
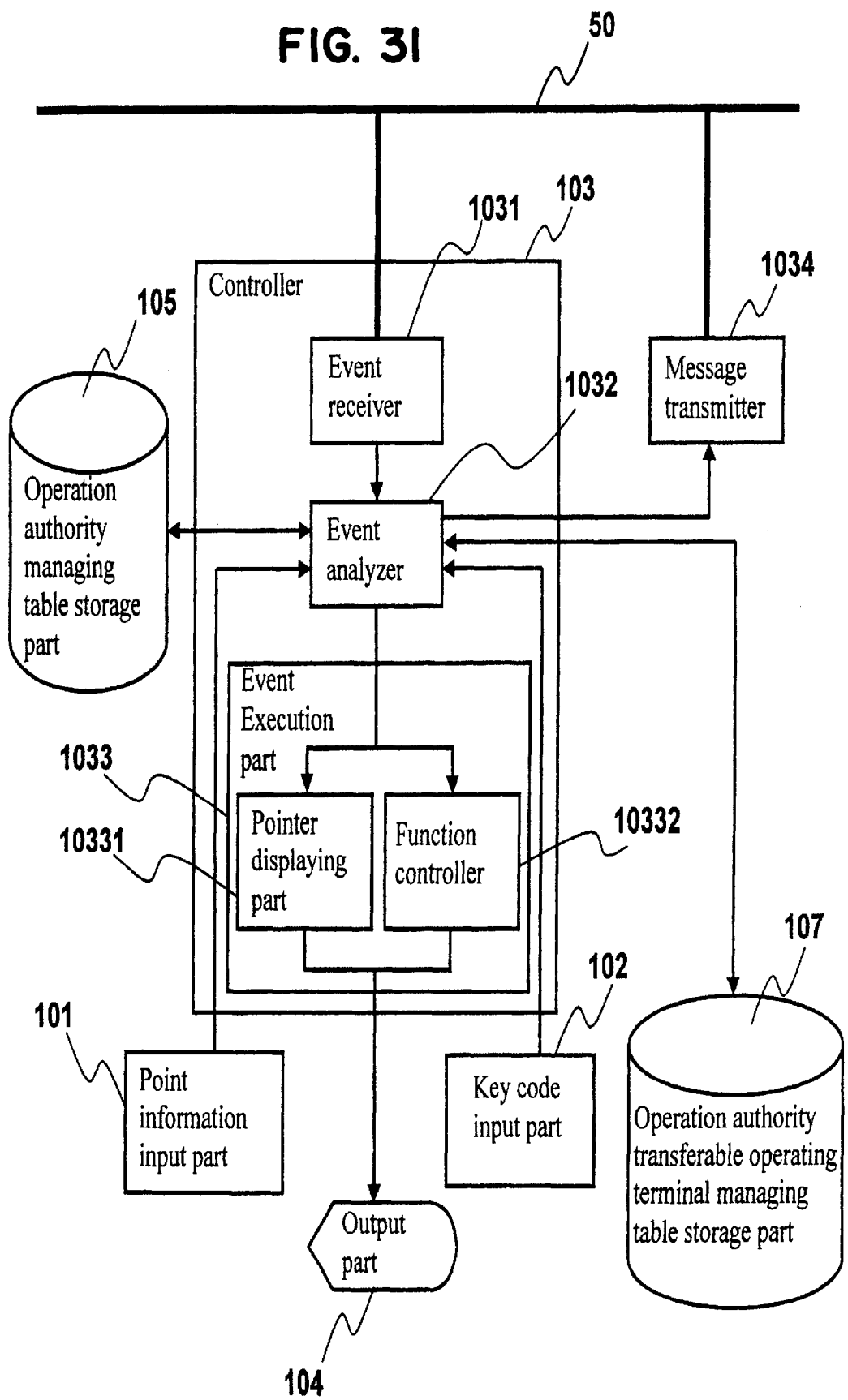
FIG. 31 is a block diagram showing the structure of an operated terminal according to an eleventh embodiment of the present invention.

FIG. 30 is a block diagram showing the structure of an operating terminal of the eleventh embodiment. As shown in FIG. 30, the operating terminal of this eleventh embodiment comprises the message receiving part 3034 in the controller 303 in addition to the configuration shown in FIG. 3. FIG. 31 is a block diagram showing the structure of an operated terminal of this eleventh embodiment. As shown in FIG. 31, the operated terminal of this eleventh embodiment comprises the message transmitting part 1034 and the operation authority transferable operating terminal managing table 107 in the controller 103 in addition to the configuration shown in FIG. 12. The operation authority transferable operating terminal managing table 107 is described in detail further below.

As shown in FIGS. 30 and 31, the operating terminal and the operated terminal of this eleventh embodiment can perform bi-directional communication between the operating terminal and the operated terminal by utilizing the message receiving part 3034 and the message transmitting part 1034. The reason for the bi-directional communication is described further below.

Specifically, in the preceding embodiment, it is enough to achieve the described process by supporting the communication from the operating terminal to the operated terminal for replying the request of the assignment of the operation authority, and by ignoring the disused information on the operated terminal side. However, in this embodiment, the operation authority may be assigned to the operating terminal which does not request the operation authority. Therefore, the communication functions, not only for transmitting the message from the operating terminal to the operated terminal but also for transmitting the message from the operated terminal to the operating terminal, are required.

Figure 32:
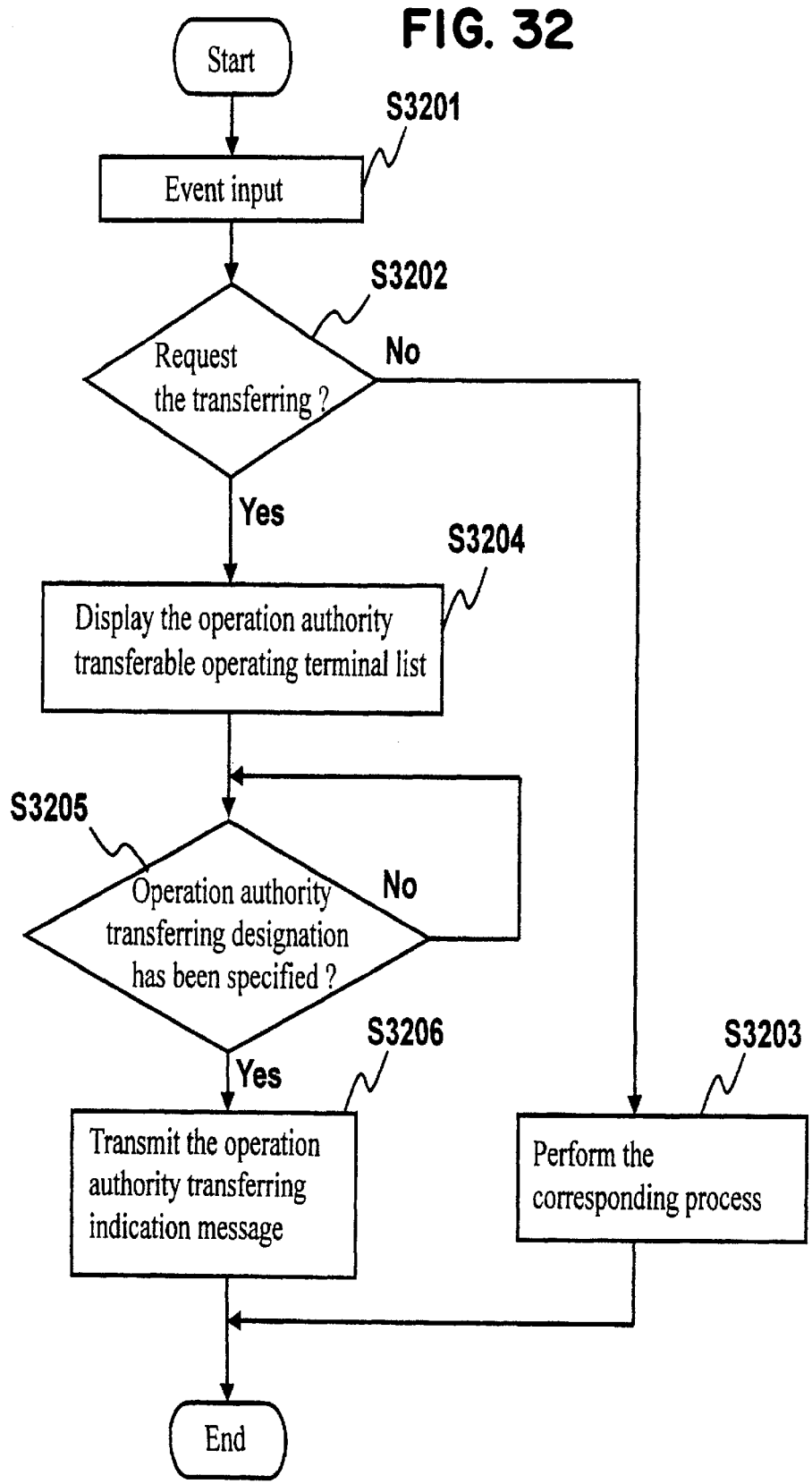
FIG. 32 is a flow chart showing the processing procedure of the controller of the operating terminal according to an eleventh embodiment of the present invention.
Figure 33:
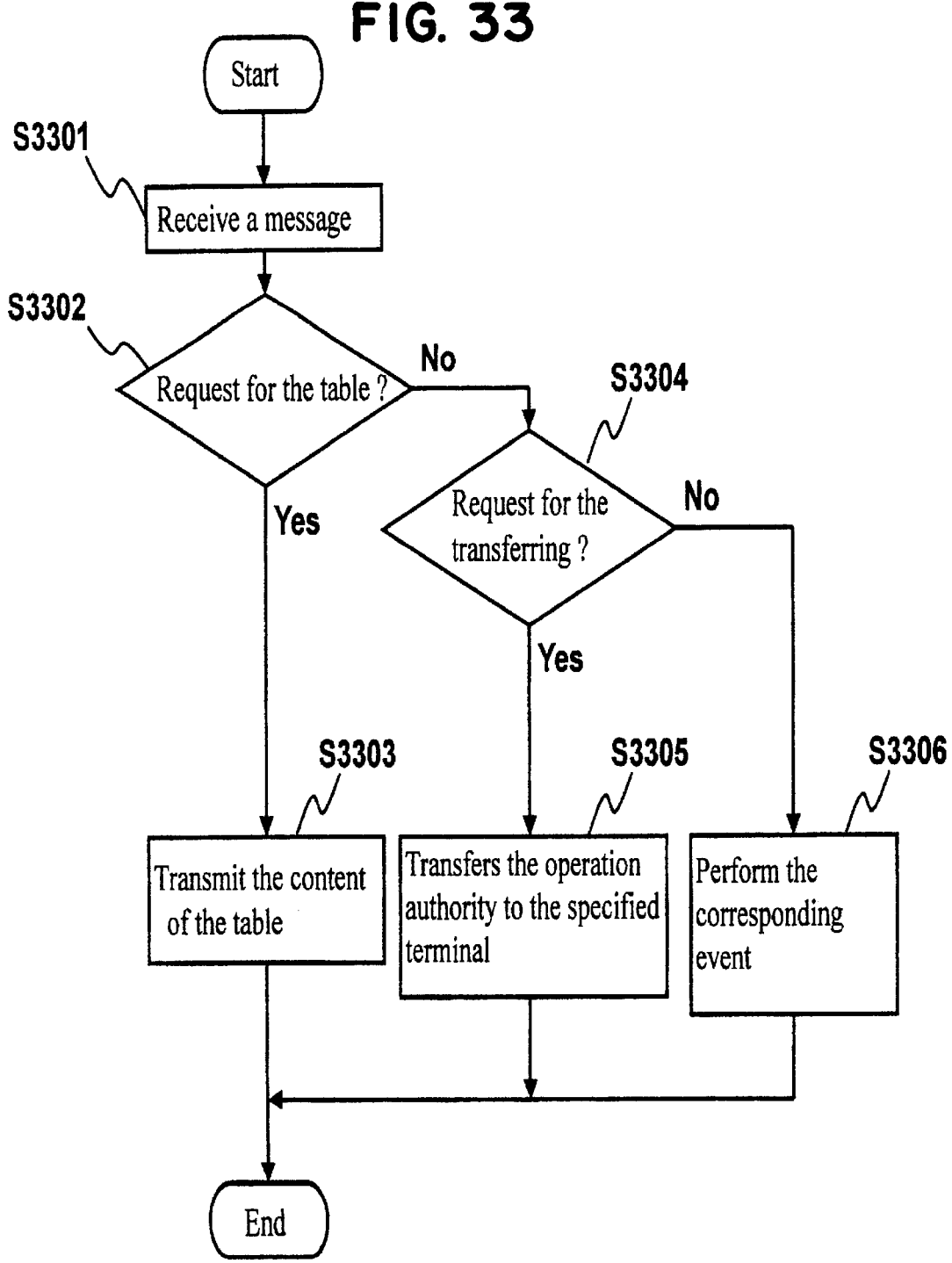
FIG. 33 is a flow chart showing the processing procedure of the controller of the operated terminal according to an eleventh embodiment of the present invention.

FIG. 32 is a flow chart showing the processing procedures of the controller 303 of the operating terminal of this eleventh embodiment and FIG. 33 is a flow chart showing the processing procedures of the controller 103 of the operated terminal of this eleventh embodiment.

The controller 303 of the operating terminal receives the event inputting (S 3201), it judges the received event is the request for transition of the operation authority or not (S 3202). In particular, the request for transferring the operation authority is performed by utilizing the pull-down menu, and so on. If the received event is not the request for transferring the operation authority (S 3202: No), the corresponding process is performed (S 3203).

If the received event is the request for transition of the operation authority (S 3202: Yes), the operated terminal obtains the operating terminal ID list for the operation authority transferable operating terminal and displays the list on the output part 304 (S 3204). As described below, the operated terminal stores and manages the operating terminal ID of the operation authority transferable operating terminal in the operation authority transferable operating terminal managing table. Therefore, the operating terminal receives the information from the table of the operated terminal and displays the list on the output part 304.

Then, the operating terminal to which the operation authority transferring designation is specified by: the pointer input part 301 and so on (S3205: Yes), the operation authority transferring indication message for the specified terminal is transmitted to the. operated terminal (S 3206).

Next, the processing of the operated terminal is described below. FIG. 33 is a flow chart showing the processing procedures of the controller 103 of the operated terminal of this eleventh embodiment. As shown in FIG. 33, the operated terminal receive the message (S 3301), the controller 103 judges the received message is the transmission request of the operation authority transferable operation authority managing table or not (S 3302).

FIG. 34 is an example of the contents of an operation authority transferable operating terminal managing table of this eleventh embodiment. The example shown in FIG. 34 is the most simple example case, the operated terminal stores the IP address of the operating terminal connected to the operated terminal. Specifically, the operated terminal 10 adds a terminal ID in the table respectively when a terminal build the connection and join the operation. The stored terminal ID in the table is retained in the table until the notification of the "end of operation joint" is transmitted from the operating terminal. By retaining the terminal ID in the table, the operated terminal can judges the operating terminal which does not have the operation authority is in the operation authority transferable status or not.

Specifically, the operated terminal can judges that operating terminal is as the terminal to which the operation authority can transfer or lend.

If the received message is the transmission request (S 3302: Yes), the content of the table is transmitted to the operating terminal which request the 44. transmission (S 3303). If the received message is not the transmission request (S 3302: No), operated terminal judges that the message is the request for transferring of the operation authority or not (S 3304).

If the message is the request for transferring of the operation authority (S 3304: Yes), the operation authority is transferred to the specified terminal (S 3305). If the message is not the request for transferring of the operation authority (S 3304: No), the corresponding event is performed (S 3306).

By the above process, the operation authority can be transferred or lent from the terminal which obtains the operation authority to the other terminal. Specifically, the processing for transferring the operation authority is described in the above flow chart, the processing for lend can be easily performed by storing the operating terminal ID of the transferring terminal to the transferred terminal, and returning the operation authority to the transferring terminal again when the transferred terminal releases the operation authority.

As described above, the terminal operation system of this embodiment can control the assignment of the operation authority appropriately if the one operated terminal is operated by the plural operating terminals simultaneously. It also can control the transferring the operation authority among the operating terminal smoothly on the basis of the controlling the assignment of the operation authority.

Figure 35:
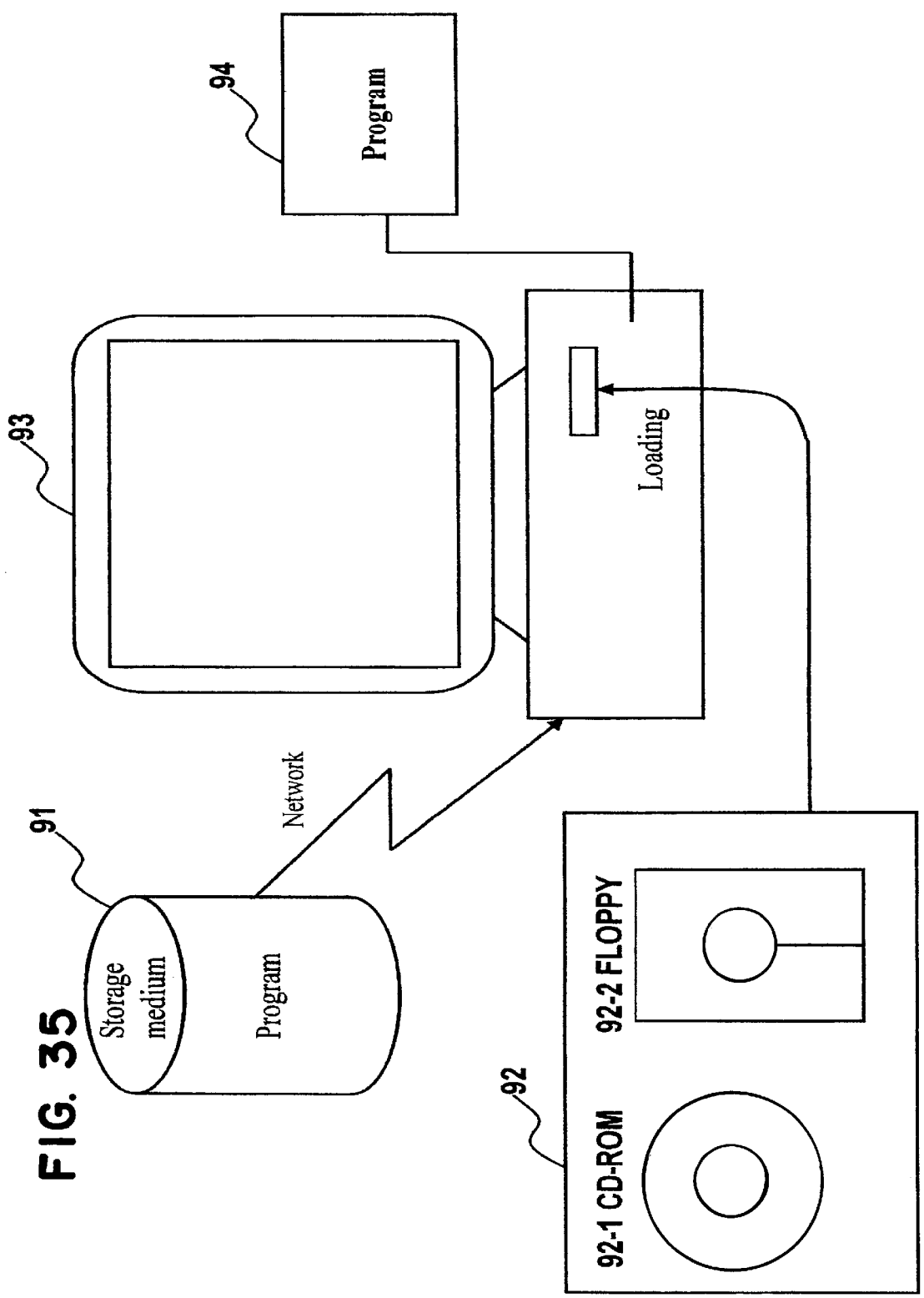
FIG. 35 is a diagram illustrating a storage medium.

A recording medium for storing a program for realizing a terminal operation system according to the present invention can be a portable recording medium, such as a CD-ROM or a floppy disk as illustrated in an example of a recording medium in FIG. 35, or a recording device provided at the end of a communication line, a computer hard-disk or a RAM-storage. When the program is executed, it is loaded and executed in the main memory.

As described above, the terminal operation system of the present invention provides an effect of realizing an appropriate control of the assignment of the operation authority in case that one operated terminal is operated by plural operating terminals simultaneously.

Furthermore, the terminal operation system of the present invention can provides an effect of realizing smooth transferring of the operation authority among the operating terminal based on the control of the assignment of the operation authority.

What is claimed is:

1. A terminal operation system including a plurality of terminals connected via a network, wherein
    an operated terminal can be operated by an operating terminal through an input device connected to the operating terminal;
    the operating terminal has a certain operation authority which corresponds to one of a plurality of operation authority levels that are layered in accordance with the functions that can be performed on the operated terminal; and
    the operated terminal comprises:
        an operation authority requesting terminal storage part for storing at least one operating terminal which tries to obtain the operation authority for operating the operated terminal in a predetermined period that starts when the operating terminal tries to obtain an operation authority in a certain level; and
        an operation authority assigned terminal determining part for determining after a predetermined period an operating terminal to which the operation authority is assigned out of the operation terminals stored during said predetermined period in the operation authority requesting terminal storage part.

2. A computer-readable recording medium storing a program for realizing a terminal operation system comprising a plurality of terminals connected via a network, wherein a terminal having an input device can operate another terminal via the input device, the program comprising processes for realizing:
    an operation authority request receiving step, where a request for an operation authority for operating an operated terminal on a network is received from an operating terminal which tries to operate the operated terminal;
    an operation authority requesting terminal storing step, where at least one operating terminal which tries to obtain the operating authority for operating the operated terminal within a predetermined period after receiving the request is stored; and
    an operation authority assignment terminal determining step, where an operating terminal is selected after said predetermined period from the at least one operating terminal stored during said operation authority requesting terminal storing step to be the operating terminal to which the operation authority is assigned.

3. A terminal operation system comprising:
    a plurality of terminals connected via a network, where an operated terminal can be operated by at least one operating terminal through an input device connected to the operating terminal,
    the at least one operating terminal has an operation authority which corresponds to one of a plurality of operation authority levels classified in accordance with the functions that can be performed on the operated terminal,
    operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority; and
    an operation authority determining part for determining dynamically an operation authority to be given when a plurality of operating terminals compete to obtain operation priority for a function performed on the operated terminal based on the respective exclusive operation authorities.

4. The terminal operation system according to claim 3, wherein the operation authority determining part determines the operating terminal conducting a predetermined operation as the operating terminal which obtains the operation priority.

5. The terminal operation system according to claim 4, wherein the predetermined operation is a mouse click operation.

6. The terminal operation system according to claim 3, comprising:

a multiple pointer display part for displaying a plurality of pointers on the same display, where each of the plurality of pointers is operated by a corresponding operating terminal independently based on the multiple pointer authority which is one of a non-exclusive operation authority.

7. The terminal operation system according to claim 6, wherein when an operating terminal is operating a mouse click operation which can not be accepted by its present multiple pointer authority and which can be accepted by the upper operation authority for a mouse click operation, the operation authority of the operating terminal is upgraded to the upper operation authority for a mouse click operation regarding such mouse click operation as a trigger for the operation authority upgrade.

8. The terminal operation system according to claim 7, wherein if the upper operation authority for a mouse click operation is an exclusive operation authority, when the operation authority upgrade is conducted, an operation authority of an operating terminal which originally has the upper operation authority for a mouse click is downgraded to the multiple pointer authority instead.

9. The terminal operation system according to claim 6, wherein an operating terminal can perform a function that is not covered by the operation authority it currently has only a certain number of times based on the operation authority.

10. The terminal operation system according to claim 6, a timer for measuring a time of no operation period for each terminal; and a painter erasing part for erasing pointers which have not moved for a predetermined period from the display.

11. The terminal operation system according to claim 3, comprising:

an operation authority level changing part for changing dynamically an operation authority level of an operation authority that an operating terminal currently has to another operation authority level by a predetermined operation.

12. The terminal operation system according to claim 3, wherein when an operating terminal is operating an operation which can not be accepted by its present operation authority and which can be accepted by the upper operation authority, the operation authority of the operating terminal is upgraded to the upper operation authority regarding such operation as a trigger for the operation authority upgrade.

13. The terminal operation system according to claim 12, wherein if the upper operation authority is an exclusive operation authority, when the operation authority upgrade is conducted, an operation authority of an operating terminal which originally has the upper operation authority is downgraded instead.

14. The terminal operation system according to claim 3, wherein operation priority is established among nonexclusive operation authorities on the same operation authority level being assigned to a plurality of terminals based on how the respective operation authorities were obtained.

15. A terminal operation system, comprising:

a plurality of terminals connected via a network, where an operated terminal can be operated by at least one operating terminal through an input device connected to the operating terminal, the at least one operating terminal has an operation authority which corresponds to one of a plurality of operation authority levels classified in accordance with the functions that can be performed on the operated terminal, operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority;

wherein the operation authorities can be obtained by several kinds of processes, and operation authorities on the same operation authority level vary in functions that can be covered by the respective operation authorities depending on how they were obtained.

16. A terminal operation system, comprising:

a plurality of terminals connected via a network, where an operated terminal can be operated by at least one operating terminal through an input device connected to the operating terminal, the at least one operating terminal has an operation authority which corresponds to one of a plurality of operation authority levels classified in accordance with the functions that can be performed on the operated terminal, operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority;

wherein an operating terminal can perform a function that is not covered by the operation authority it currently has only a certain number of times based on the operation authority.

17. A terminal operation system, comprising:

a plurality of terminals connected via a network, where an operated terminal can be operated by at least one operating terminal through an input device connected to the operating terminal, the at least one operating terminal has an operation authority which corresponds to one of a plurality of operation authority levels classified in accordance with the functions that can be performed on the operated terminal, operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority;

a timer for measuring a time of no operation period for each terminal; and a pointer erasing part for erasing pointers which have not moved for a predetermined period from the display.

18. A terminal operation system, comprising:

a plurality of terminals connected via a network, where an operated terminal can be operated by at least one operating terminal through an input device connected to the operating terminal, the at least one operating terminal has an operation authority which corresponds to one of a plurality of operation authority levels classified in accordance with the functions that can be performed on the operated terminal, operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority; and an operation authority transferring part for transferring an operation authority assigned to an operating terminal to one of the other operating terminals.

19. A terminal operation system, comprising:

a plurality of terminals connected via a network, where an operated terminal can be operated by at least one operating terminal through an input device connected to the operating terminal, the at least one operating terminal has an operation authority which corresponds to one of a plurality of operation authority levels classified in accordance with the functions that can be performed on the operated terminal, operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority; and an operation authority lending part for lending an operating authority assigned to an operating terminal to one of the other operating terminals;

wherein the operation authority lending part returns the operation authority lent thereto to the operating terminal that has lent the operation authority thereto.

20. A computer program for realizing a terminal operation system, comprising:

a plurality of terminals connected via a network, where an operated terminal can be operated by at least one operating terminal through an input device connected to the operating terminal;

an operation authority level classifying operation, where the operating terminal has an operation authority which corresponds to one of a plurality of operation authority levels classified in accordance with the functions that can be performed on the operated terminal, wherein the operation authorities on the plurality of operation authority levels are categorized as an exclusive operation authority only, or an exclusive operation authority and a nonexclusive operation authority; wherein the exclusive operation authority is defined as being exclusive of other operation authorities regarding a function performed on the operated terminal based on the operation authority; and a nonexclusive operation authority is defined as being not exclusive of other operation authorities regarding a function performed on the operated terminal based on the operation authority; and an operation authority determining operation for determining dynamically an operation authority to be given when a plurality of operating terminals compete to obtain operation priority for a function performed on the operated terminal based on the respective exclusive operation authorities.

* * * * *